(12) United States Patent
Yamada

(10) Patent No.: US 7,434,886 B2
(45) Date of Patent: Oct. 14, 2008

(54) HEADREST SUPPORT AND LOCKING MEMBER WHICH IS ASSEMBLED TO HEADREST SUPPORT

(75) Inventor: Nobuo Yamada, Kariya (JP)

(73) Assignee: Nihon Technica Co., Ltd., Aichi-ken (JP)

( * ) Notice: Subject to any disclaimer, the term of this patent is extended or adjusted under 35 U.S.C. 154(b) by 155 days.

(21) Appl. No.: 11/171,369

(22) Filed: Jul. 1, 2005

(65) Prior Publication Data

US 2006/0163931 A1  Jul. 27, 2006

(30) Foreign Application Priority Data

Jan. 21, 2005 (JP) ............... 2005-014197

(51) Int. Cl.
*A47C 7/36* (2006.01)
(52) U.S. Cl. ............................ 297/410; 297/391
(58) Field of Classification Search ............ 297/410, 297/391
See application file for complete search history.

(56) References Cited

U.S. PATENT DOCUMENTS

| | | | | |
|---|---|---|---|---|
| 5,738,413 A | * | 4/1998 | De Filippo | 297/410 |
| 5,788,250 A | * | 8/1998 | Masters et al. | 297/410 |
| 5,816,658 A | * | 10/1998 | Wallis | 297/410 |
| 5,860,703 A | * | 1/1999 | Courtois et al. | 297/410 |
| 6,099,077 A | * | 8/2000 | Isaacson | 297/410 |
| 6,454,356 B1 | * | 9/2002 | Yamada | 297/410 |
| 6,742,846 B1 | * | 6/2004 | Isaacson | 297/410 |
| 6,874,854 B2 | * | 4/2005 | Terrand et al. | 297/410 |
| 2003/0205925 A1 | * | 11/2003 | Ford | 297/410 |

FOREIGN PATENT DOCUMENTS

| | | |
|---|---|---|
| JP | 2-23842 | 2/1990 |
| JP | 3475320 | 4/1999 |

\* cited by examiner

*Primary Examiner*—Sarah B McPartlin
(74) *Attorney, Agent, or Firm*—Edwards Angell Palmer & Dodge LLP

(57) ABSTRACT

A headrest support holds a headrest arranged on a seat by fitting engagement, is supported on a receiving member formed on the seat, and has a through hole for fitting a stay of the headrest therein. A stay-and-receiving-member pressing portion having resiliency is formed by forming a first cut groove on an intermediate portion of a barrel portion of the headrest support and by setting the stay-and-receiving-member pressing portion free in at least two directions from the barrel portion. The stay-and-receiving-member pressing portion is formed in an arcuate shape as viewed in a cross section, wherein a curved inner surface which is curved toward a stay side is formed at a center portion of a curved inner surface and a projecting outer surface which projects toward the receiving member side is formed on a curved outer surface end portion.

10 Claims, 23 Drawing Sheets

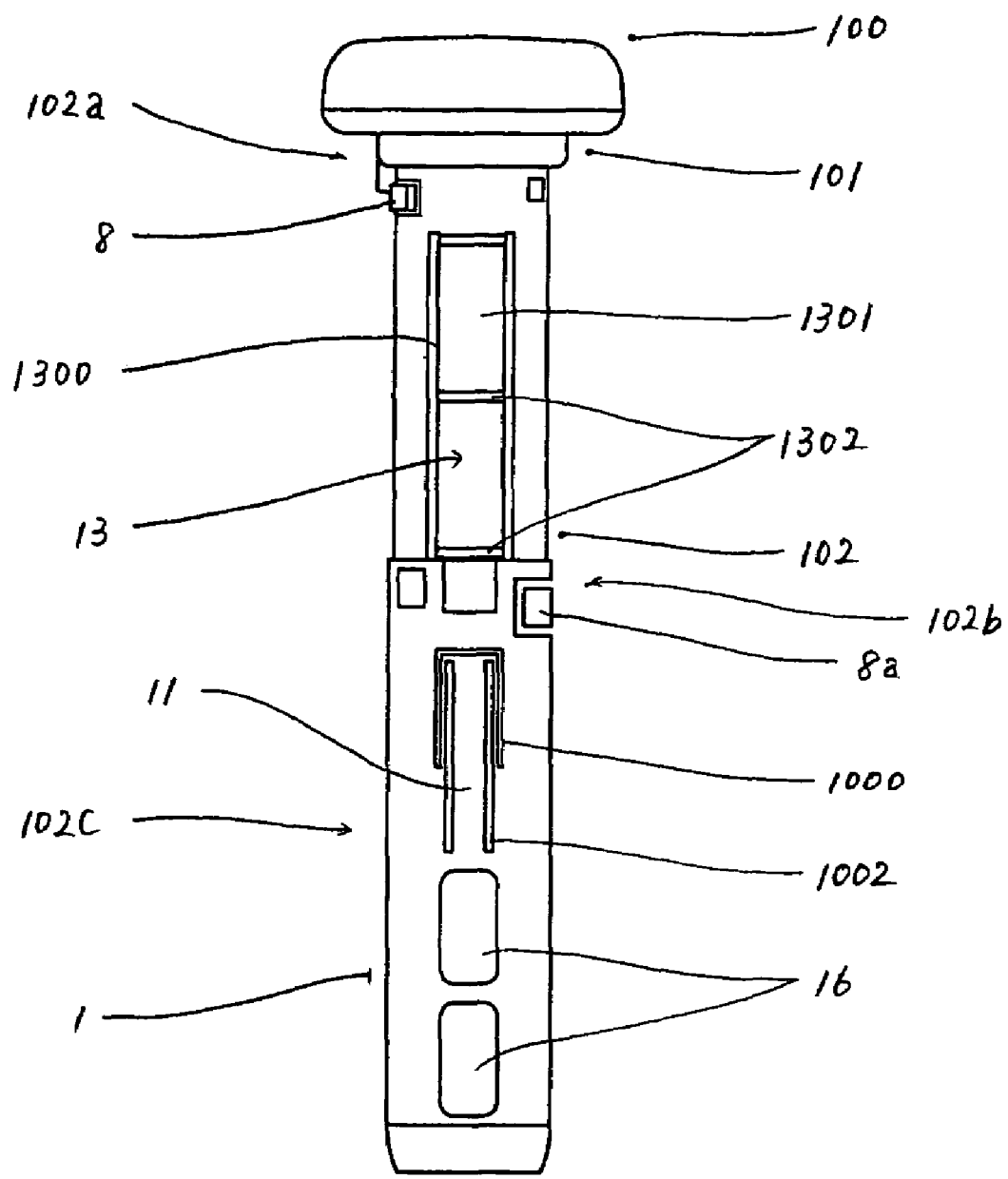

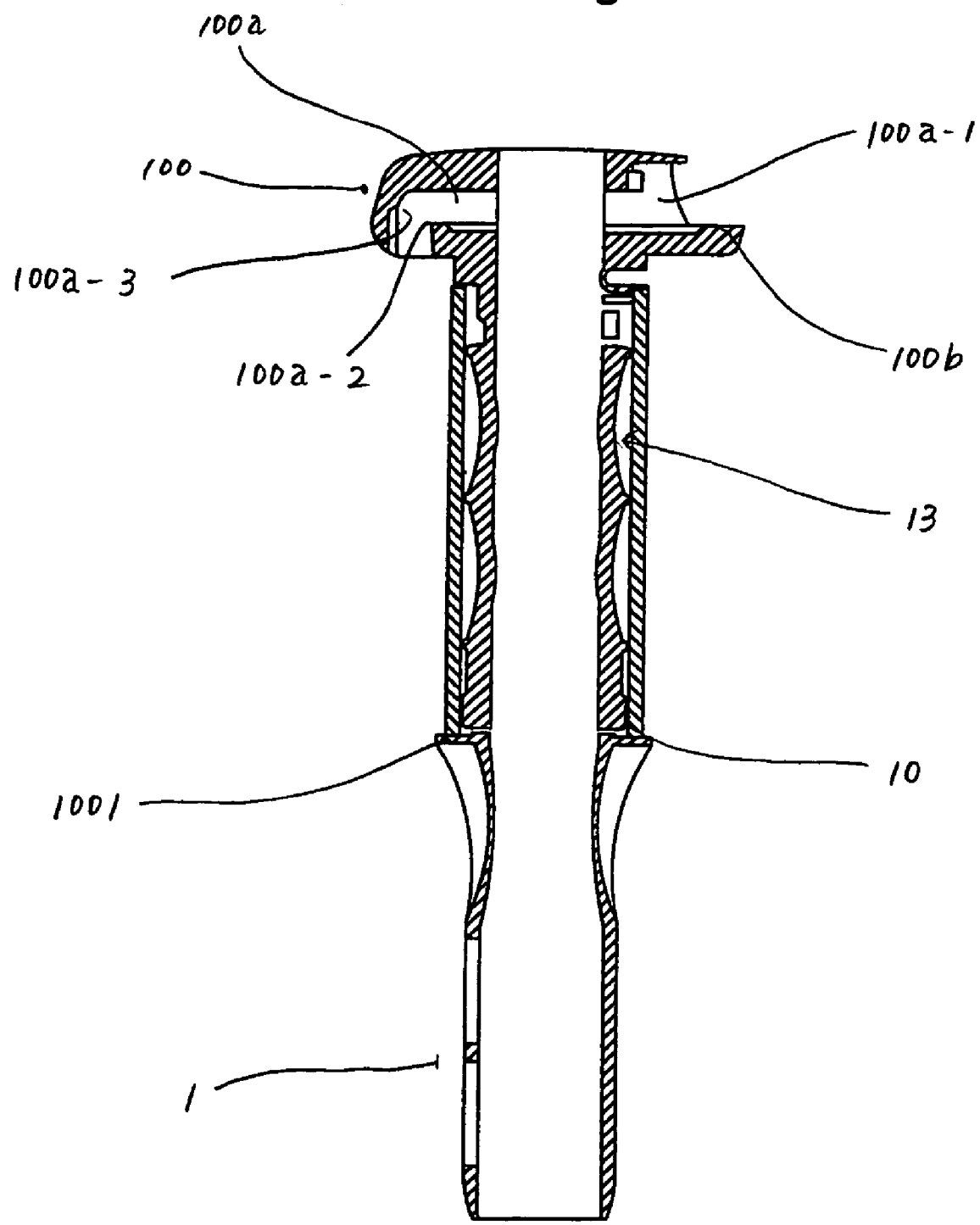

HEADREST SUPPORT AND LOCKING MEMBER WHICH IS ASSEMBLED TO HEADREST SUPPORT

BACKGROUND OF THE INVENTION

1. Field of the Invention

The present invention relates to a headrest support which supports a headrest of a seat of various transport means (vehicle, airplane, vessel and the like), and more particularly to a headrest support which can support a headrest which is mounted on the transport means by way of a receiving member and/or a headrest stay by completely eliminating a play of the headrest (setting the play to approximately zero) and a locking member which is assembled to the headrest support.

2. Description of the Related Art

With respect to this type of transport means, particularly with respect to the vehicle, along with the lapse of time, demands for the safety, the comfortable ride, the easiness of manipulation or driving and the like have been changed and hence, various improvements have been made to meet the demands. With such improvements, it is possible to enhance the safety, the comfortable ride, the tranquility or the functionality of the vehicle. Further, recently, due to the enhancement of the hermetic property of the vehicle, there has been a particular demand for the tranquility in the interior of the vehicle. To ensure the safety, the comfortable ride, the tranquility and the like, it is necessary to eliminate rattling sounds which are generated in the headrest and in the vicinity of the headrest. The rattling sounds are generated due to the presence of a fitting gap between a stay of the headrest which supports the headrest (hereinafter referred to simply as "stay") and a headrest support which supports the stay in a state that the stay is inserted (supported by fitting) into the headrest and/or an insertion supporting (fitting) gap (play, clearance or the like) which is formed between the headrest support and a square-pipe-shaped receiving member (support receiving member) which is fixedly secured to a seat, and the vibration at the time of traveling. Accordingly, the rattling sounds are increased depending on kinds of vehicles and/or the high-speed traveling, the rough road or the like thus giving rise to the deterioration of the comfortable ride. In view of the above-mentioned situation, the elimination of the rattling sounds constitutes an urgent task to be solved.

Japanese Utility Model Laid-open He12(1990)-23842 (prior literature 1) discloses the related structure for preventing rattling sounds. That is, the literature 1 discloses "the support structure of a headrest stay". To summarize the structure, resilient projecting members are mounted on a holder portion which includes through holes allowing the fitting of stays, and the holder portion is brought into pressure contact with the bracket by making use of the resilient projecting members whereby the hermetic property is ensured and, at the same time, the stays are resiliently supported by way of the slits formed in the holder portion. This structure is characterized in that with the use of the resilient projecting members and/or the slits, a gap between the stays and the holder portion and a gap between the bracket and the holder portion are respectively eliminated thus achieving the prevention of the rattling sounds and the reduction of the friction resistance to the holder portion which is generated when the stays are moved upwardly and downwardly.

Here, inventors of the present invention have already proposed the epoch-making headrest support and/or the structure as means for overcoming such rattling sounds and these headrest support and/or the structure have satisfied the demands of the market. Further, the headrest support and/or the structure are already mounted on various vehicles in Japan and foreign countries. Japanese Patent 3475320 (prior literature 2) discloses such headrest support and/or the structure. That is, the literature 2 is directed to "a headrest support". To summarize the headrest support, the headrest support holds stays of a headrest arranged above a seat by fitting and is supported on a receiving member arranged on the seat. The headrest support has a head portion, a neck portion and a barrel portion which are integrally formed. Through holes which allow the fitting of the stays therein are formed in the headrest support. Stay pressing portions which resiliently hold the stays inwardly by way of cut grooves are formed in the barrel portion. Tongue portions which can be biased downwardly are formed in the neck portion and bias the receiving means downwardly. Removal-prevention bulging portions which support a lower surface of the receiving member are formed on the barrel portion in a state that the removal-prevention bulging portions are arranged to face the tongue portions. Here, the tongue portions and/or the removal-prevention bulging portions are provided for preventing the removal of the headrest support and the generation of plays, while the stay pressing portions are provided for preventing the generation of plays by pressing the stays. Due to such constitution, the headrest support can obtain following advantages.

(A) It is possible to insert the stays without being influenced by the irregularities of tolerances of respective portions or the irregularities of tolerances attributed to temperature change and hence, it is possible to assemble the headrest with no play in a fitting state of the stays and the headrest support.

(B) When the stays are inserted into the headrest support, the projecting portions formed on the inner peripheral surface of the stay pressing portion are resiliently outwardly biased due to the stays and hence, it is possible to insert the stays with a reasonable load.

(C) It is possible to eliminate rattling sounds between the stays and the headrest support and between the headrest support and the support receiving member (receiving member).

(D) It is possible to realize the driving of a vehicle while ensuring the comfortable ride and the tranquility.

Further, since the headrest support is integrally formed, the manufacturing cost can be reduced.

However, to consider a current situation where the above-mentioned substantially complete elimination of the rattling sounds is strongly desired, it is desirable to achieve the further improvement of the above-mentioned headrest support and/or the structure.

SUMMARY OF THE INVENTION

The constitution disclosed in the above-mentioned literature 1 can cope with the situation when the headrest is small-sized and a distance from the seat to the headrest is short, that is, an elevation height is low. The reason is that when the headrest is small-sized, it is possible to cope with the situation by making the stays and/or brackets and holder portions (support structure) which support the headrest light-weighted and compact. Further, in a state that the elevation height is low, it is possible to simplify the support structure. However, under a current situation which aims at the enhancement of safety, functionality and the like by increasing a size of the headrest or under a current situation in which the elevation height of the headrest is increased so as to prevent a driver from suffering from whiplash at the time of collision and damages on his/her neck portion (in other words, the elevation height being low currently), the constitution disclosed in the literature 1 is not sufficient or less than optimal. Further, in holding the headrest at the high elevation height, it is a prerequisite to ensure the large support structure so as to firmly support (hold and/or press or the like), while in the prevention of the rattling sounds, it is a prerequisite to eliminate gaps in the support structure so as to firmly and resiliently support the headrest.

Further, the structure disclosed in the literature 2 has an advantage as the improvement of the structure disclosed in the literature 1. That is, the structure is configured such that the stays are resiliently supported by the projecting portions formed on the inner peripheral portion of the stay pressing portion and, at the same time, the stays are moved upwardly or downwardly and/or are inserted into or removed from the headrest support with a proper load. However, to consider (A) large-sizing of the headrest and (B) the structure which increases the elevation height into consideration, the structure disclosed in the literature 2 is not sufficient or less than optimal. Further, the structure disclosed in the literature 2 adopts the constitution in which the stays are assembled using the projecting portions formed on the inner peripheral surfaces of the stay pressing portions in a state that there exist no plays when the stays and the headrest support are fitted to each other. Accordingly, to cope with the irregularities of tolerances of respective parts and the irregularities of tolerances attributed to the temperature change, the structure disclosed in the literature 2 is not sufficient or less than optimal (it is apparent from the past achievements). Further, when given vehicle types and/or given conditions (the assurance of further comfortable ride and tranquility) are taken into consideration, the structure disclosed in the literature 2 is not sufficient or less than optimal.

In view of the above circumstances, the present invention has following constitutional features.

(1) In fitting (inserting) a stay in a headrest support, a stay-and-receiving-member pressing portion and first to third stay pressing portions which are mounted on a headrest support are selectively adopted, the degree of fitting (gap) which is formed depending on various conditions such as design, tolerances, using materials and the like is adjusted between both of them thus obviating the generation of rattling sounds and easing the insertion. Cue to such a constitution, it is possible to overcome drawbacks attributed to the size of the gap. That is, this constitutional feature (1) overcomes the drawback in which when the degree of fitting is excessively strong and the gap is small, an excessive load is applied when the stay is inserted (inserted and removed) and/or when the stay is elevated or lowered and the operability is deteriorated. Further, the constitutional feature (1) also can overcome the drawback in which when the degree of fitting is excessively weak, the gap becomes excessively large thus generating the rattling sounds. Further, the constitutional feature (1) can enhance the operability (functions) and the safety and the elimination of the rattling sounds. Still further, the constitutional feature (1) can enhance the tranquility, the comfortable ride and the like. Further, the degree of fitting is changed depending on the temperature difference or temperature (hereinafter referred to as "temperature difference") attributed to the interior and/or weather of season or daytime/night even after assembling. Accordingly, even when the fitting can be performed smoothly originally when the vehicle is delivered, the degree of fitting is largely changed due to the temperature change which takes place thereafter. Accordingly, the present invention provides the structure which matches the temperature difference attributed to all these vehicle conditions, the using state, the weather conditions and the like.

(2) In fitting the headrest support in the receiving member, the stay-and-receiving member pressing portion, the receiving member pressing portion, the removal prevention bulging portion and/or a pair of resilient members which assume the facing relationship with the removal prevention bulging portion are selectively adopted and, thereafter, the degree of fitting which is formed depending on various conditions such as design, tolerances, using materials and the like is adjusted between both of them thus obviating the generation of rattling sounds and easing the insertion and the like. Further, it is possible to overcome drawbacks attributed to the size of the gap.

(3) Further, by facilitating the assembling and by completely eliminating the generation of the defective parts, it is possible to achieve the reduction of the manufacturing cost, the reduction of the vehicle cost or the manufacture of the defective products whereby it is possible to provide the structure which can protect the environment and can make use of resources.

According to a first aspect of the present invention, there is provided a headrest support which holds a headrest arranged on a seat by fitting engagement, is supported on a receiving member which is arranged on the seat, and has a through hole which allows the fitting of a stay of the headrest therein, wherein the headrest support is constituted of an approximately umbrella-like head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by forming a first cut groove in an intermediate portion of the barrel portion and, at the same time, by setting the stay-and-receiving-member pressing portion free in at least two directions from the barrel portion, the stay-and-receiving-member pressing portion is formed in an arcuate shape as viewed in a cross section, wherein a curved inner surface which is curved toward a stay side is formed at a center portion of an arcuate inner surface, and a projecting outer surface which projects toward the receiving member side is formed on an arcuate outer surface end portion, one or plural pairs of resilient members are respectively formed on an upper portion and an intermediate portion of the barrel portion, and an outer peripheral surface of the stay is pressed by the curved inner surface and an inner surface of the receiving member is pressed by the projecting outer surface and/or the respective pairs of the resilient members.

Due to such a constitution, according to the first aspect of the present invention, it is possible to obtain following advantageous effects. That is, rattling sounds which may be generated between the headrest support and the stay and/or the receiving member can be completely eliminated. Further, it is possible to ensure the reliable functions, the safety and no malfunctions of the headrest support even under conditions such as (a) the large-sizing of the headrest, (b) the structure which increases the elevation height of the headrest, (c) the presence of temperature difference and the like. Further, according to the first aspect of the present invention, the pairs of resilient members which assume the facing relationship respectively are provided to the upper portion and the intermediate portion of the barrel portion and the respective resilient members are brought into pressure contact with the upper and lower portions of the inner surfaces of the receiving member and hence, it is possible to obtain a practical advantageous effect that the rattling sounds which may be generated at least between the headrest support and the receiving member can be substantially completely eliminated.

According to the second aspect of the present invention, in the first aspect of the present invention, the headrest support is characterized in that a first stay pressing portion is formed by forming a second cut groove in a removal prevention bulging portion which is provided to an intermediate lower portion of the barrel portion in a state that the first stay pressing portion is set free from the removal prevention bulging portion.

Accordingly, in the second aspect of the present invention, it is also possible to obtain following advantageous effects. That is, the rattling sounds which may be generated between the headrest support and the stay and/or the receiving member can be substantially completely eliminated. Further, it is possible to ensure the reliable functions, the safety and no malfunctions of the headrest support even under conditions such as (a) the large-sizing of the headrest, (b) the structure which increases the elevation height of the headrest, (c) the presence of temperature difference and the like. Further, according to the second aspect of the present invention, the pairs of resilient members which assume the facing relationship respectively are provided to the upper portion and the intermediate portion of the barrel portion and the respective resilient members are brought into pressure contact with the upper and lower portions of the inner surfaces of the receiving member and, further, the first stay pressing portion is formed on the removal prevention bulging portion which is provided to the intermediate lower portion and the first stay pressing portion is brought into pressure contact with the stay. Accordingly, it is possible to obtain a practical advantageous effect that the rattling sounds which may be generated among the headrest support, the receiving member and the stay can be substantially completely eliminated due to the systematic constitution.

According to the third aspect of the present invention, in the first aspect of the present invention, the headrest support is characterized in that a second stay pressing portion having resiliency is formed by forming a third cut groove in an upper portion of the barrel portion in a state that the second stay pressing portion is set free from the barrel portion.

Accordingly, in the third aspect of the present invention, it is also possible to obtain following advantageous effects. That is, the rattling sounds which may be generated between the headrest support and the stay and/or the receiving member can be substantially completely eliminated. Further, it is possible to ensure the reliable functions, the safety and no malfunctions of the headrest support even under conditions such as (a) the large-sizing of the headrest, (b) the structure which increases the elevation height of the headrest, (c) the presence of temperature difference and the like. Further, according to the third aspect of the present invention, the pairs of resilient members which assume the facing relationship respectively are provided to the upper portion and the intermediate portion of the barrel portion and the respective resilient members are brought into pressure contact with the upper and lower portions of the inner surfaces of the receiving member and, further, the second stay pressing portion is formed on the upper portion of the barrel portion and the second stay pressing portion is brought into pressure contact with the stay. Accordingly, it is possible to obtain a practical advantageous effect that the rattling sounds which may be generated among the headrest support, the receiving member and the stay can be substantially completely eliminated due to the systematic constitution.

According to the fourth aspect of the present invention, in the first aspect of the present invention, the headrest support is characterized in that a receiving member is formed on an upper portion of the barrel portion by forming an annular cut groove in a state that the receiving member pressing portion is set free from the barrel portion, and a third stay pressing portion is formed on the receiving member pressing portion.

Accordingly, in the fourth aspect of the present invention, it is also possible to obtain following advantageous effects. That is, the rattling sounds which may be generated between the headrest support and the stay and/or the receiving member can be substantially completely eliminated. Further, it is possible to ensure the reliable functions, the safety and no malfunctions of the headrest support even under conditions such as (a) the large-sizing of the headrest, (b) the structure which increases the elevation height of the headrest, (c) the presence of temperature difference and the like. Further, according to the fourth aspect of the present invention, the pairs of resilient members which assume the facing relationship respectively are provided to the upper portion and the intermediate portion of the barrel portion and the respective resilient members are brought into pressure contact with the upper and lower portions of the inner surfaces of the receiving member and, further, the third stay pressing portion is formed on the receiving member pressing portion which is formed on the upper portion of the barrel portion and the third stay pressing portion is brought into pressure contact with the stay. Accordingly, it is possible to obtain a practical advantageous effect that the rattling sounds which may be generated among the headrest support, the receiving member and the stay can be substantially completely eliminated due to the systematic constitution.

According to the fifth aspect of the present invention, in the first aspect of the present invention, the headrest support is characterized in that a removable prevention bulging portion is formed on an intermediate portion of the barrel portion and a first stay pressing portion is formed in the removal prevention bulging portion in a state that the first stay pressing portion is set free from the removal prevention bulging portion by way of a second cut groove, a second stay pressing portion having resiliency is formed on an upper portion of the barrel portion by forming a third cut groove in the upper portion of the barrel portion in a state that the second stay pressing portion is set free from the barrel portion, and a receiving member pressing portion is formed on an upper portion of the barrel portion by forming an annular cut groove in the upper portion of the barrel portion in a state that the receiving member pressing portion is set free from the barrel portion, and a third stay pressing portion is formed in the receiving member pressing portion.

Accordingly, in the fifth aspect of the present invention, it is also possible to obtain following advantageous effects. That is, the rattling sounds which may be generated between the headrest support and the stay and/or the receiving member can be substantially completely eliminated. Further, it is possible to ensure the reliable functions, the safety and no malfunctions of the headrest support even under conditions such as (a) the large-sizing of the headrest, (b) the structure which increases the elevation height of the headrest, (c) the presence of temperature difference and the like. Further, according to the fifth aspect of the present invention, the pairs of resilient members which assume the facing relationship respectively are provided to the upper portion and the intermediate portion of the barrel portion and the respective resilient members are brought into pressure contact with the upper and lower portions of the inner surfaces of the receiving member and, further, the first to third stay pressing portions are formed on the upper portion of the barrel portion and the first to third stay pressing portions are brought into pressure contact with the stay. Accordingly, it is possible to obtain a practical advantageous effect that the rattling sounds which may be generated among the headrest support, the receiving member and the stay can be substantially completely eliminated due to the systematic constitution.

The sixth aspect of the present invention is directed to the headrest support which is characterized by forming a projecting member for pressing on the curved inner surface described in the first to fifth aspects of the present invention.

Accordingly, the sixth aspect of the present invention can achieve the objects of the first to fifth aspects of the present invention and, at the same time, can provide the curved inner surface of the stay-and-receiving-member pressing portion which is optimum for achieving the objects.

The seventh aspect of the present invention is directed to a locking member which is assembled to the head portion of the headrest support, wherein a resilient means for returning is provided to a planar portion of the locking member thus allowing the return of the locking member with the resilient means.

Accordingly, in the seventh aspect of the present invention, it is possible to eliminate the resilient means for returning which is provided separately from the locking member and, instead, to form such resilient means as a portion of the locking member thus achieving advantageous effects such as the reduction of cost, the speed-up of the manufacturing and the assembling and the simplification of the headrest support. Further, it is possible to achieve a practical advantageous effect that the number of parts can be reduced and hence, the cost can be reduced and the environment can be protected. Still further, it is possible to achieve the simplification and the speed-up of post processing.

BRIEF DESCRIPTION OF THE DRAWINGS

FIG. 2-1 is a front view of the headrest support;
FIG. 2-2 is a back view of the headrest support;
FIG. 3 is a cross-sectional view of FIG. 2-1;
FIG. 9-1 is a view as viewed from P1 in FIG. 7;
FIG. 9-2 is a view as viewed from P2 in FIG. 7;
FIG. 13-1 is an enlarged plan view showing an example of a resilient means of the locking member, that is, an example of a hole which can suitably cope with a large load;
FIG. 13-2 is an enlarged plan view showing an example of a resilient means of the locking member, that is, another example of the hole which can suitably cope with a large load;
FIG. 13-3 is an enlarged plan view showing an example of a resilient means of the locking member, that is, an example of a hole which can suitably cope with an middle load;
FIG. 13-4 is an enlarged plan view showing an example of a resilient means of the locking member, that is, an example of the hole which can suitably cope with a small load;
FIG. 14-1 is an enlarged schematic view for explaining the relationship between the resilient means and the stay shown in FIG. 13-1;
FIG. 14-2 is an enlarged schematic view for explaining the relationship between the resilient means and the stay shown in FIG. 13-2;
FIG. 14-3 is an enlarged schematic view for explaining the relationship between the resilient means and the stay shown in FIG. 13-3;
FIG. 14-4 is an enlarged schematic view for explaining the relationship between the resilient means and the stay shown in FIG. 13-4.

DETAILED DESCRIPTION OF EXEMPLARY EMBODIMENTS

Figure 1:
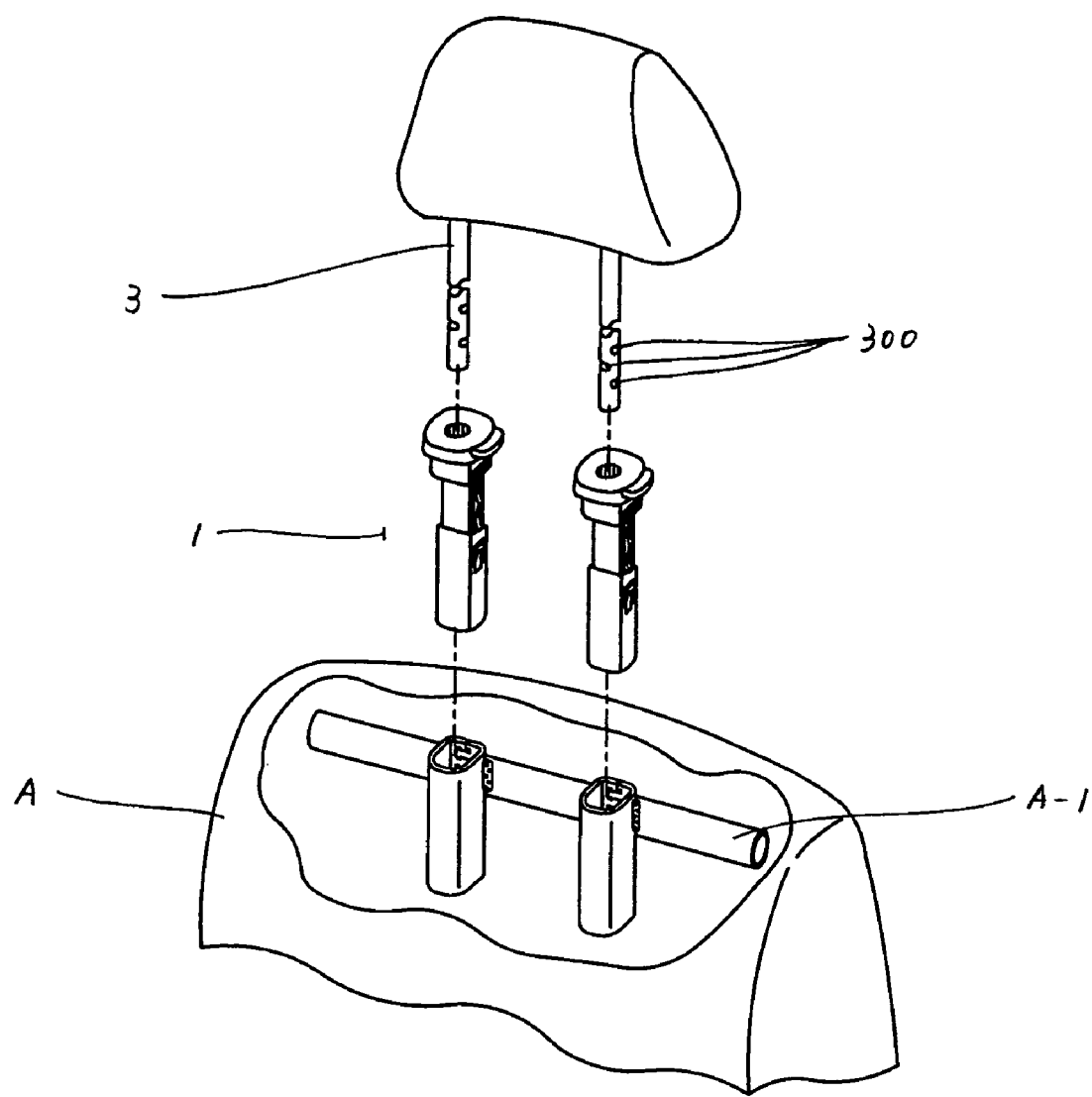
FIG. 1 is a reduced-scale schematic view showing the relationship among a headrest support, a headrest, a receiving member and a seat.
Figures 1, 2:
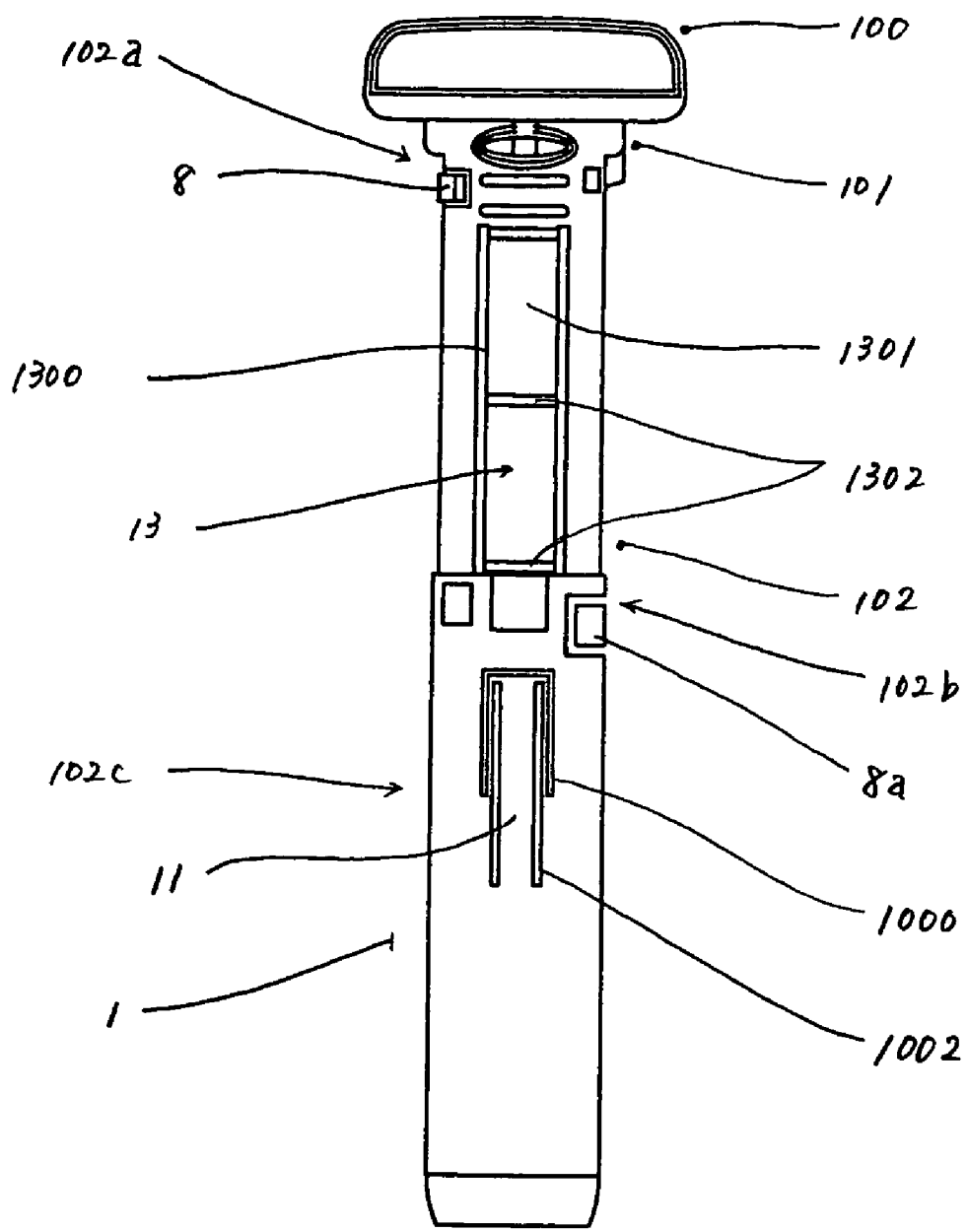
Figure 4:
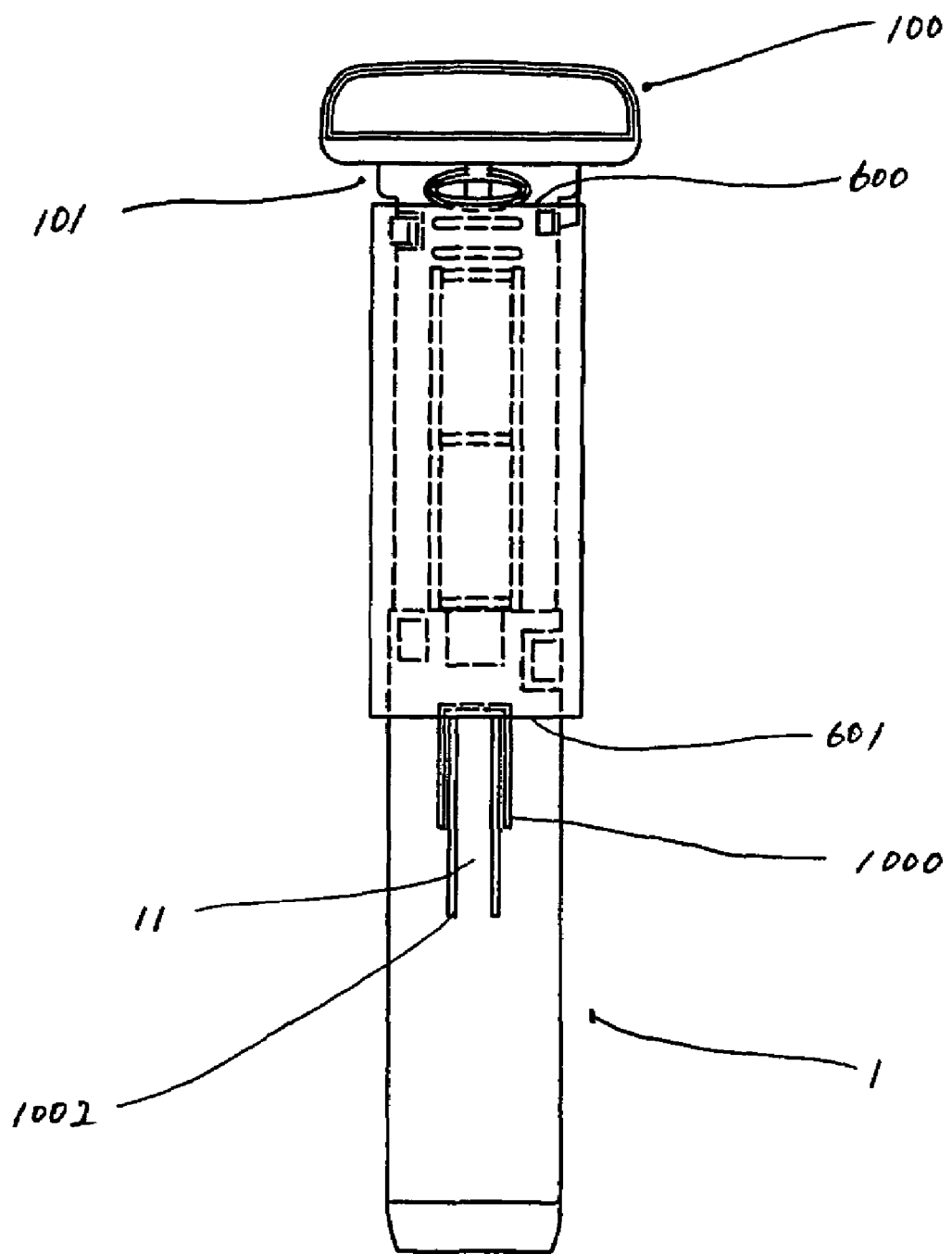
FIG. 4 is a front view showing a state in which the headrest support is fitted in a receiving member.
Figure 5:
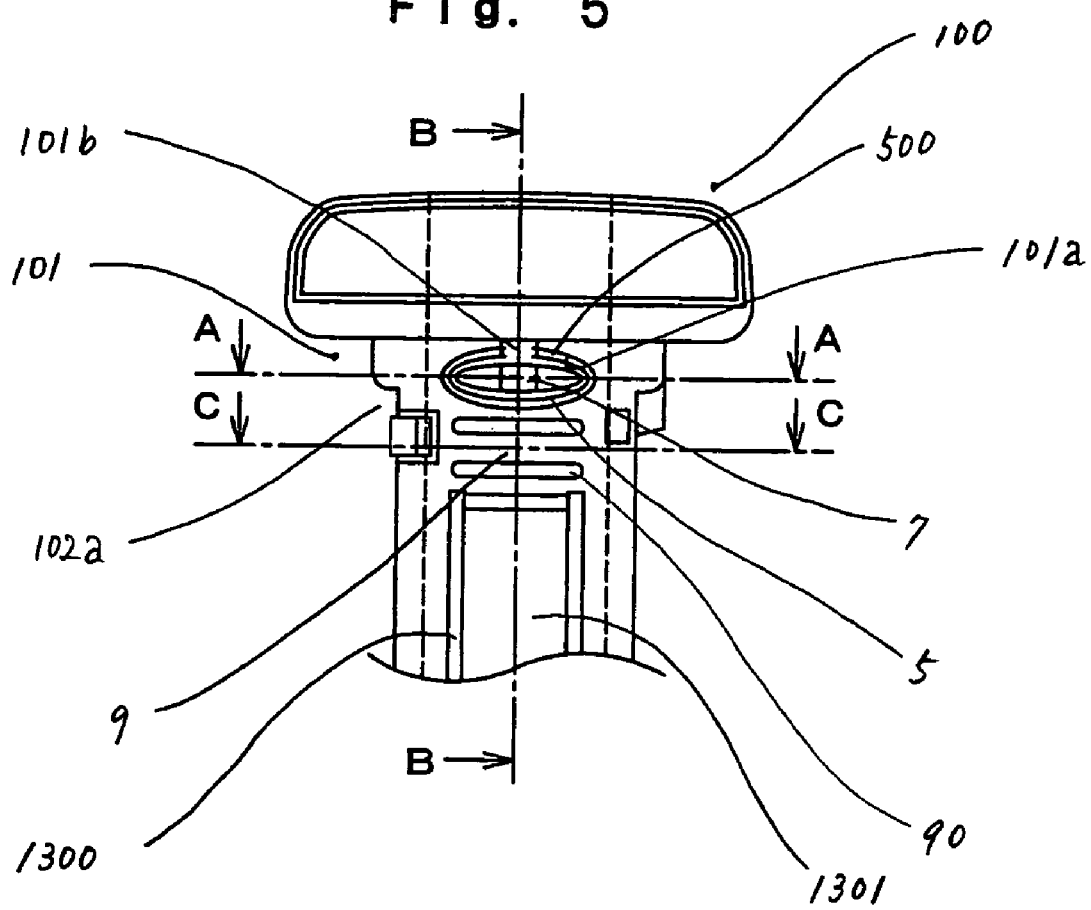
FIG. 5 is an enlarged front view of an essential part showing the headrest support, and ahead portion, a neck portion and a barrel portion of the headrest.
Figure 6:
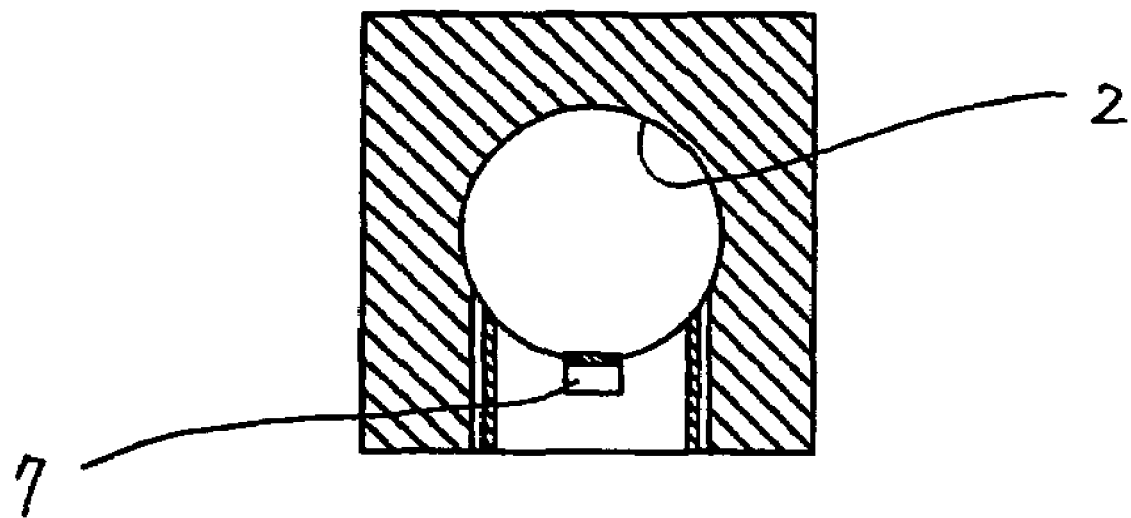
FIG. 6 is a cross-sectional view taken along a line A-A in FIG. 5.
Figure 7:
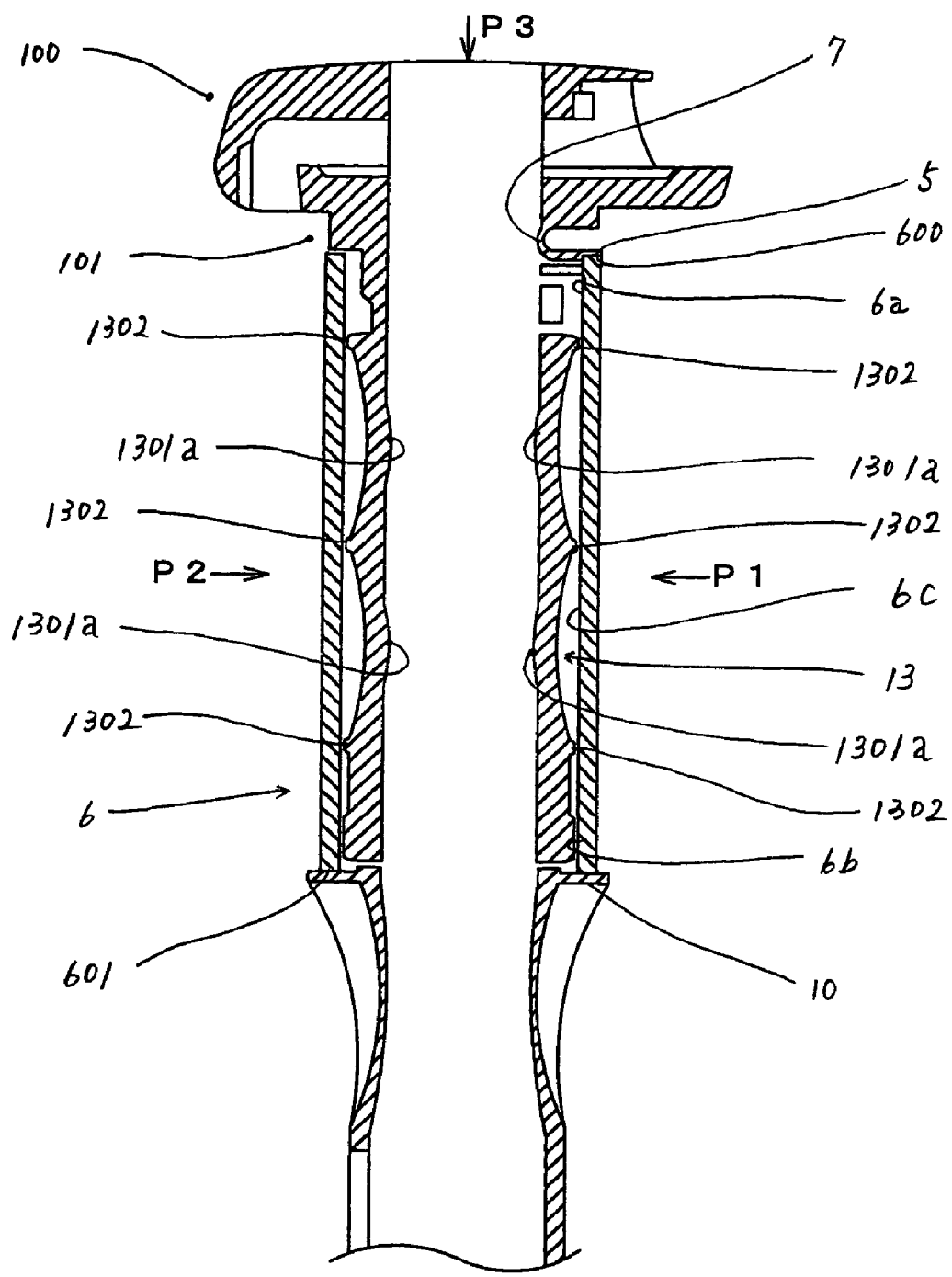
FIG. 7 is a cross-sectional view taken along a line B-B in FIG. 5.
Figure 8:
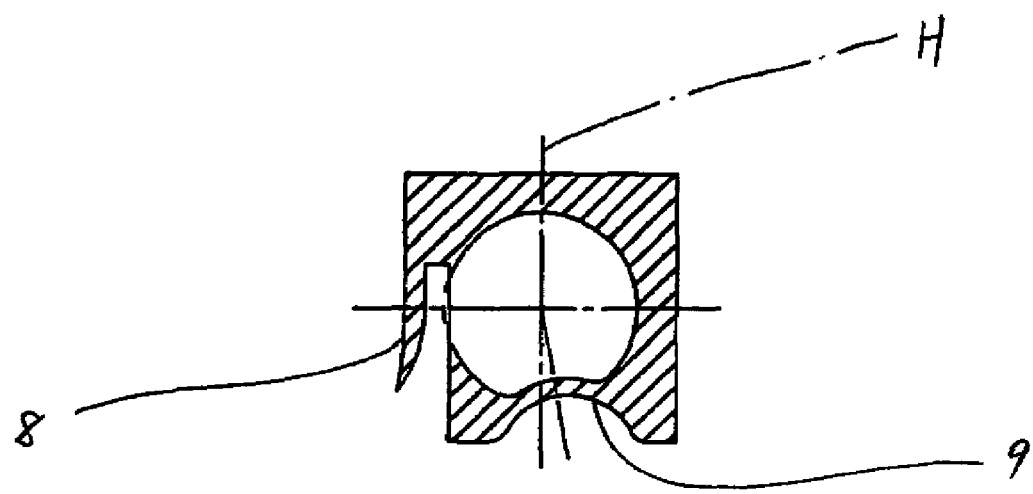
FIG. 8 is a cross-sectional view taken along a line C-C in FIG. 5.
Figures 1, 9:
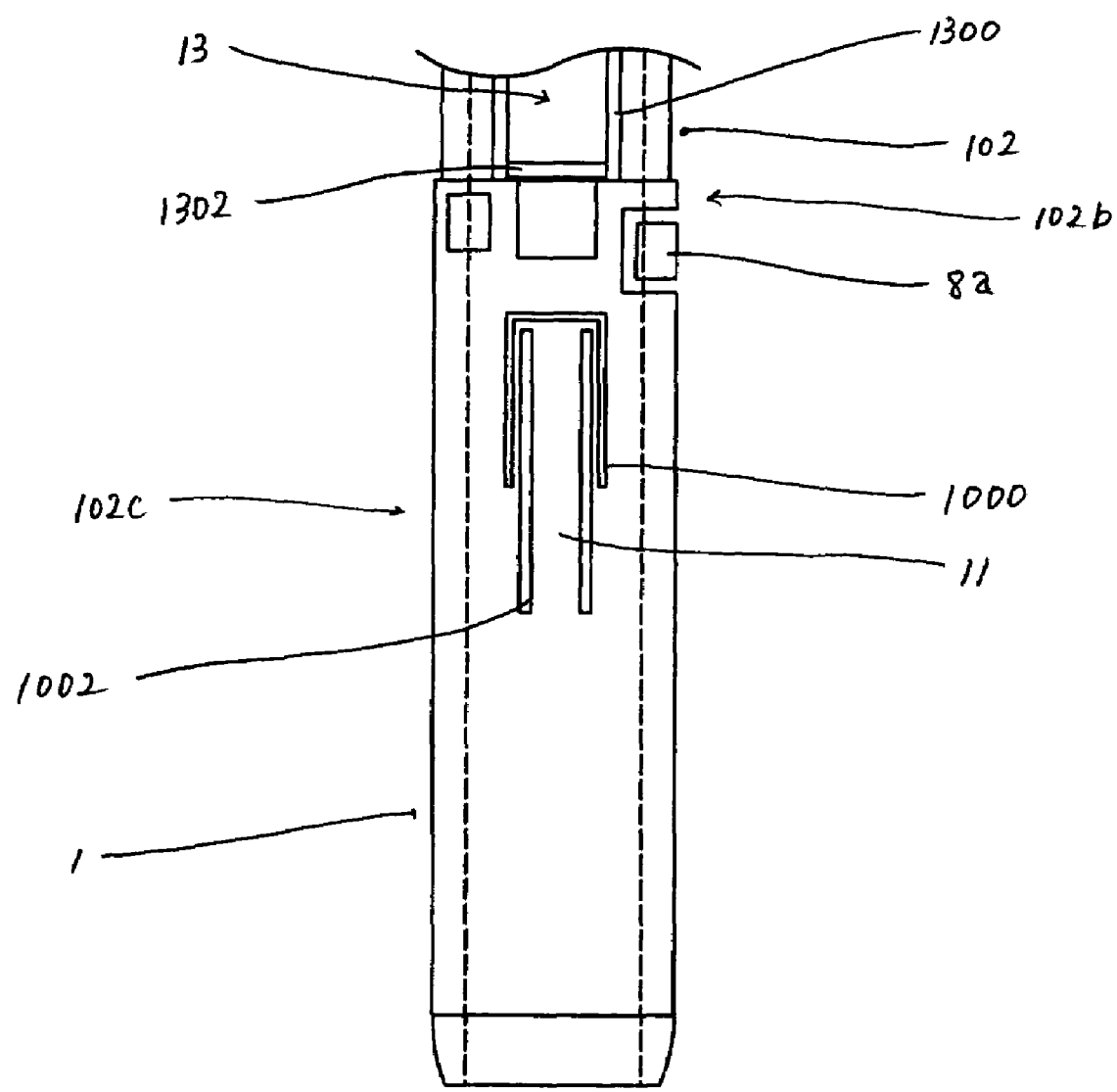
Figures 2, 9:
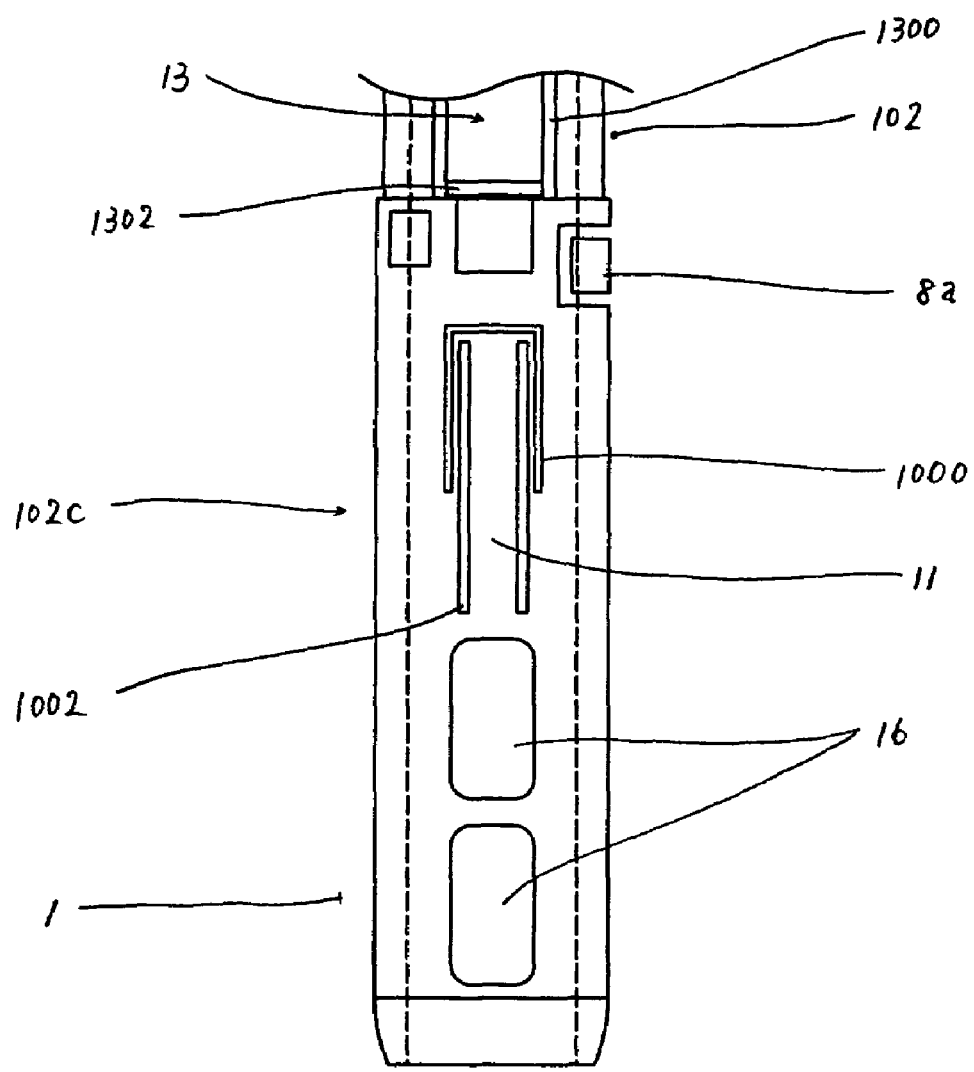
Figure 10:
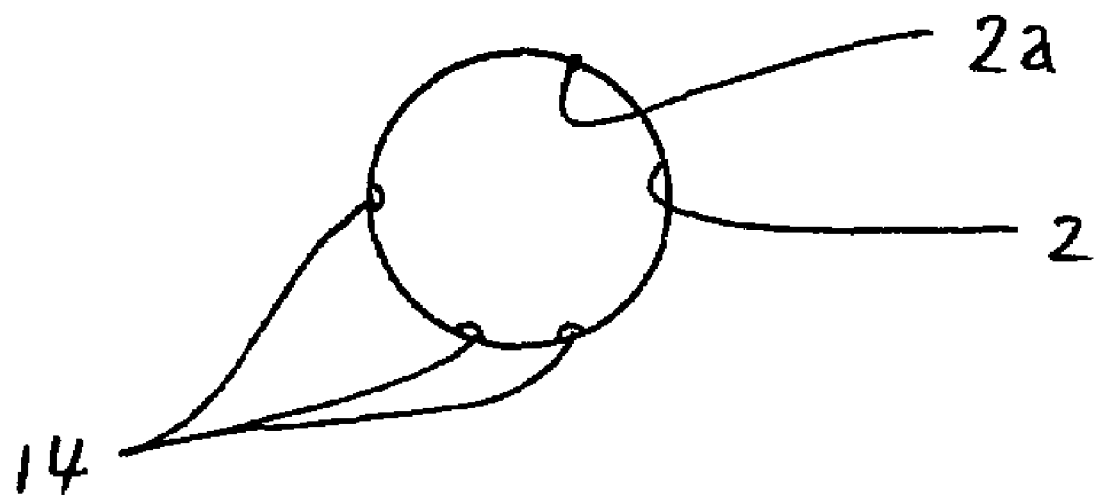
FIG. 10 is a view as viewed from P3 in FIG. 7.
Figure 11:
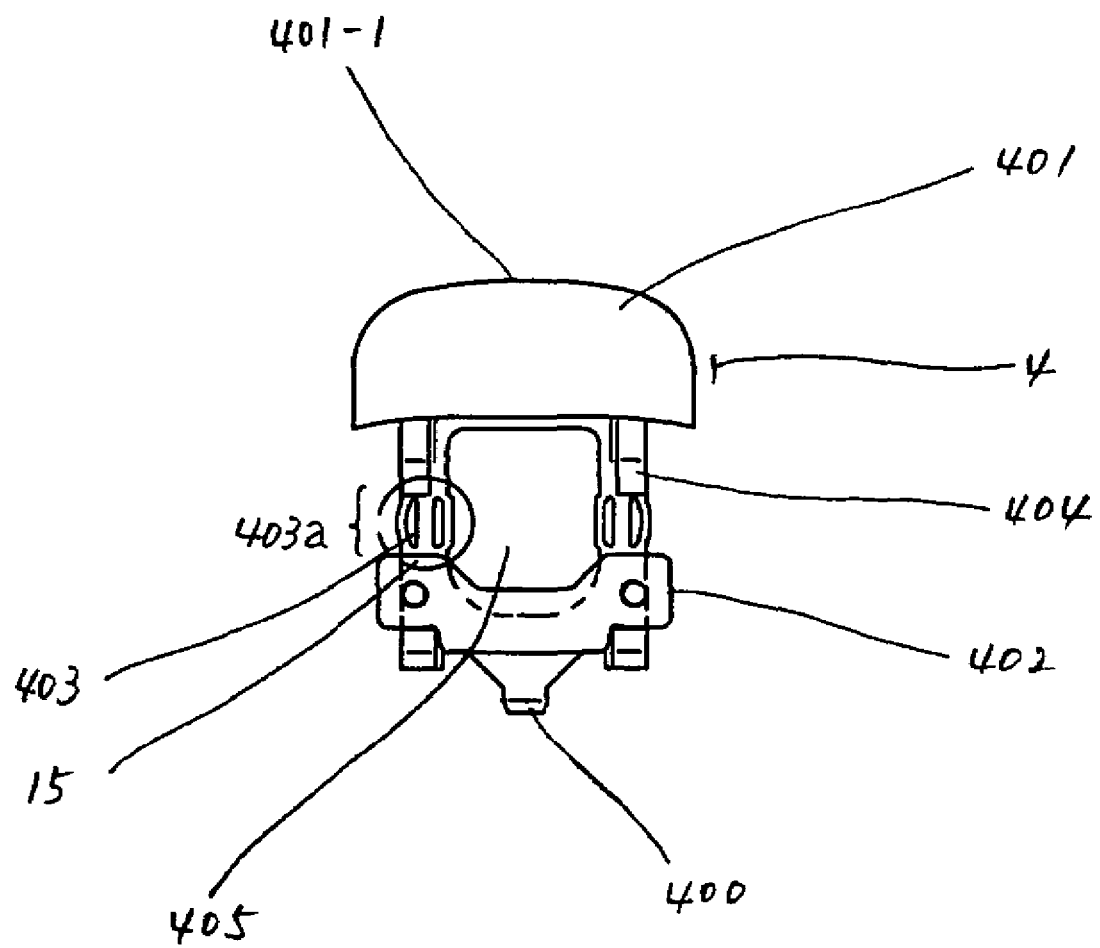
FIG. 11 is a plan view showing an example of a locking member.
Figure 12:
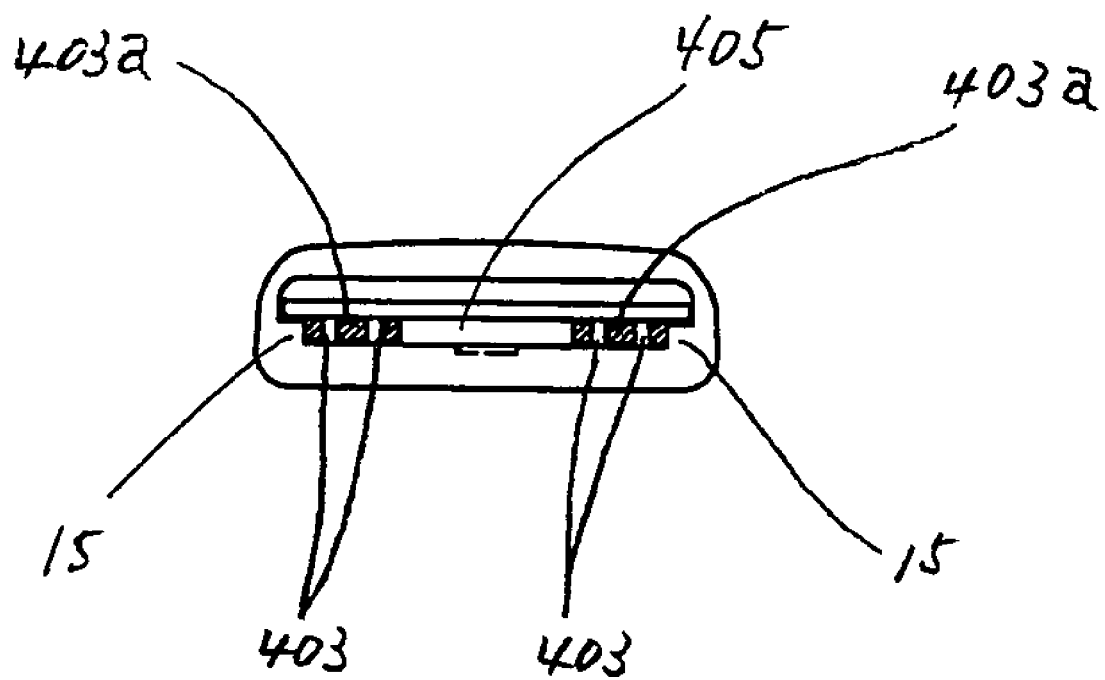
FIG. 12 is a schematic view for explaining the relationship between a cavity portion of the headrest support and the locking member.
Figures 1, 13:
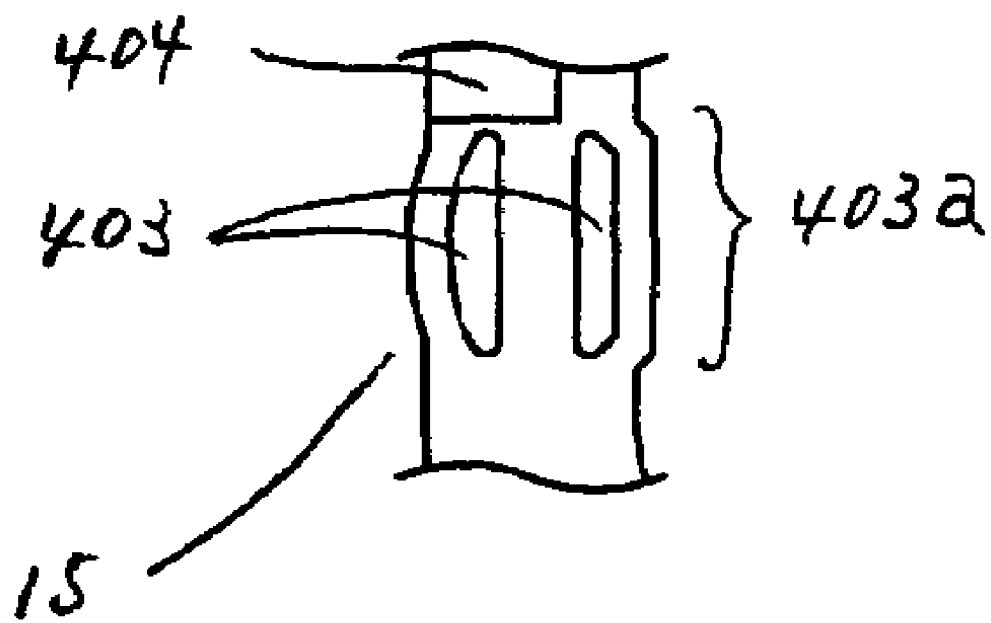
Figures 2, 13:
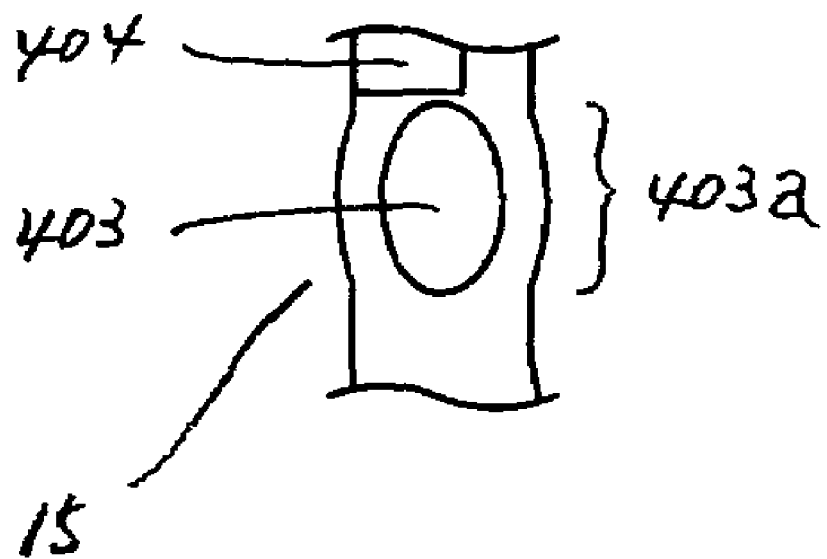
Figures 3, 13:
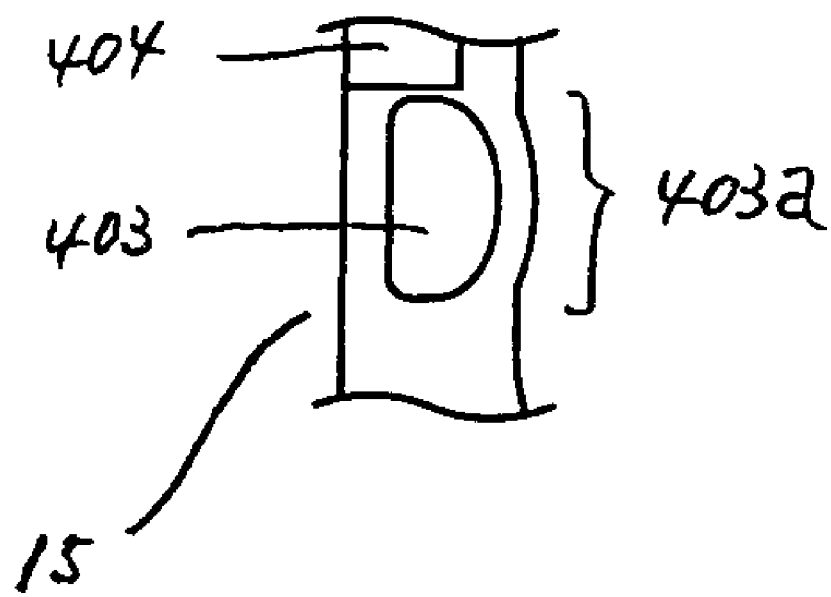
Figures 4, 13:
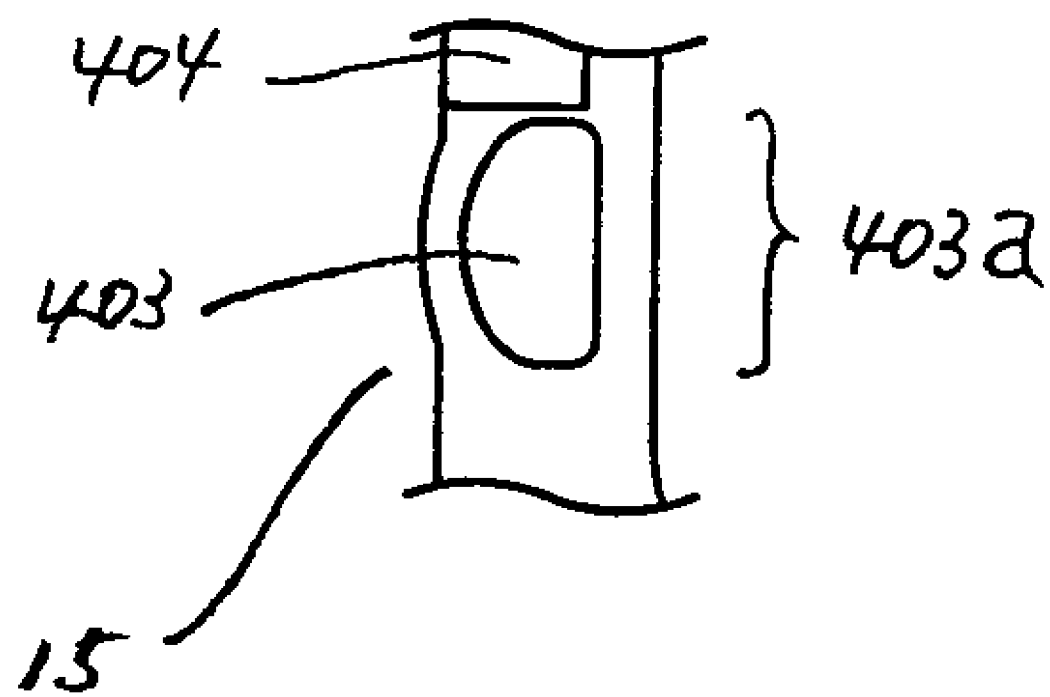
Figures 1, 14:
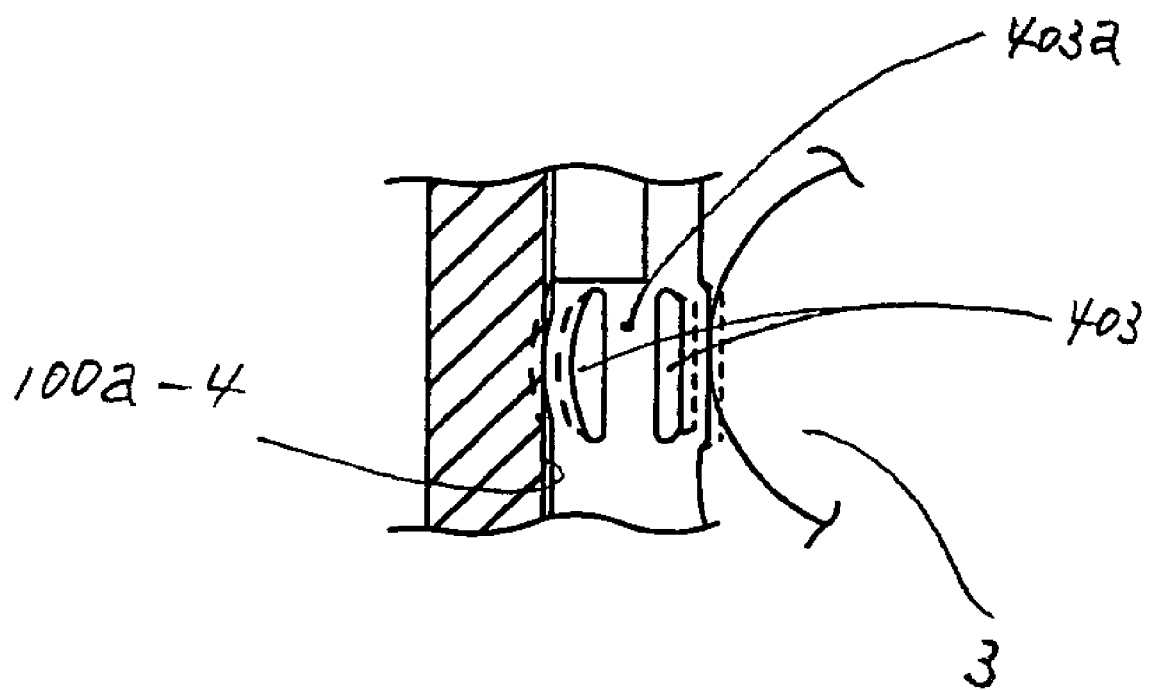
Figures 2, 14:
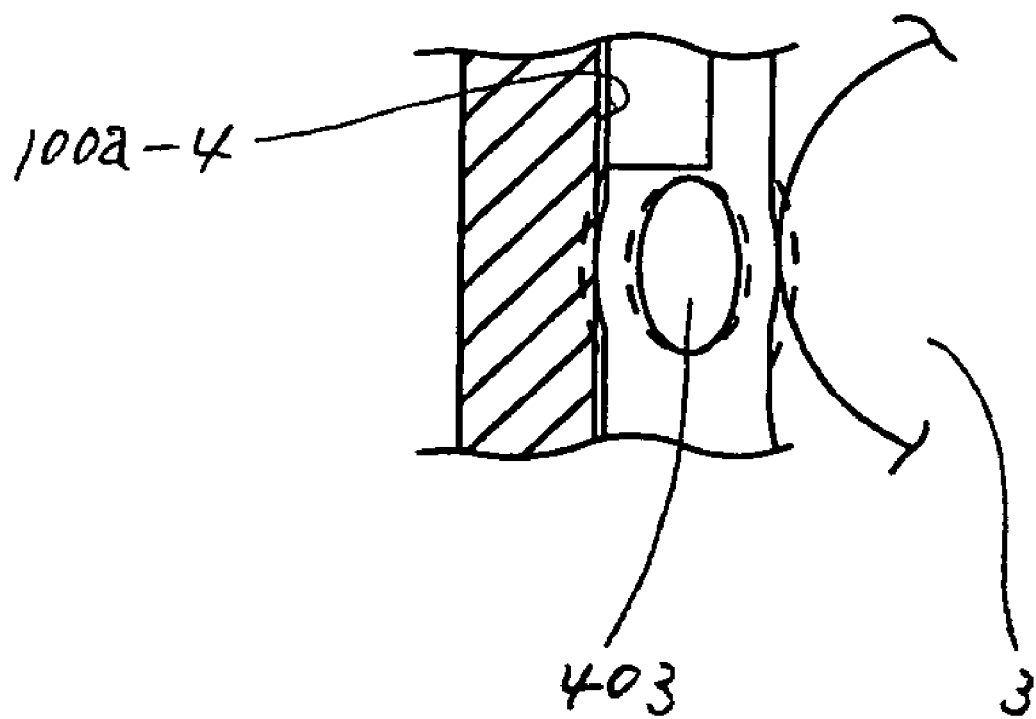
Figures 3, 14:
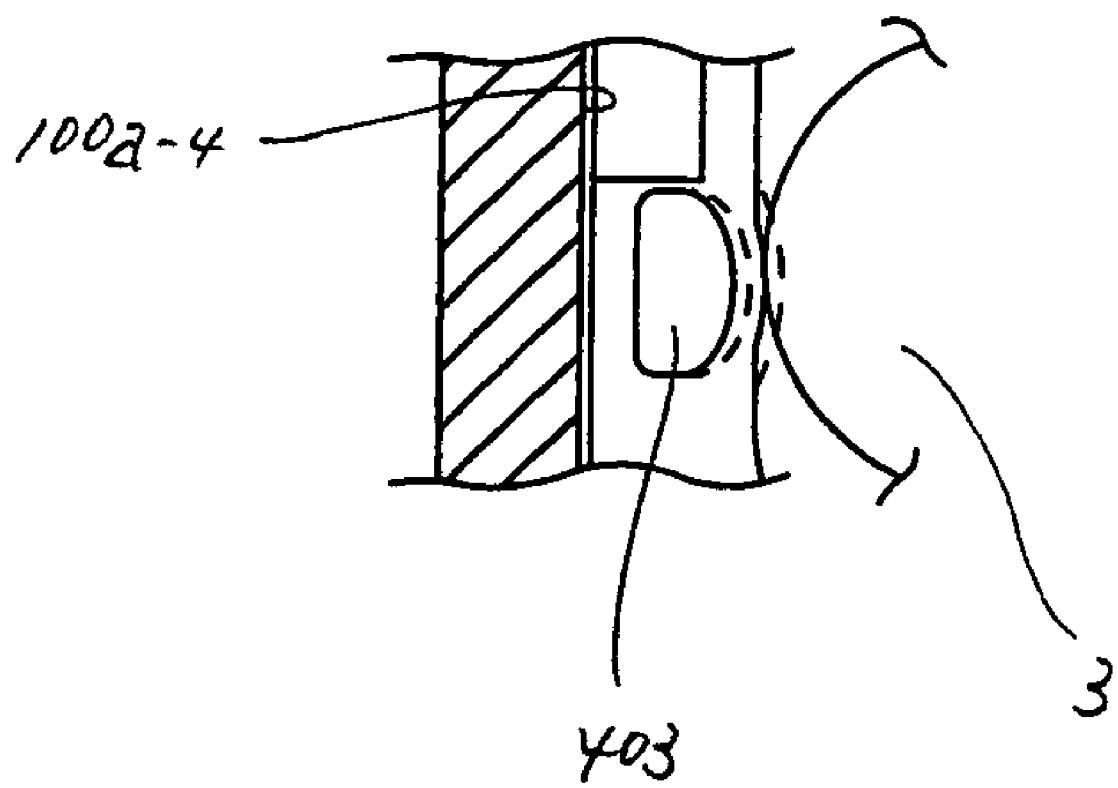
Figures 4, 14:
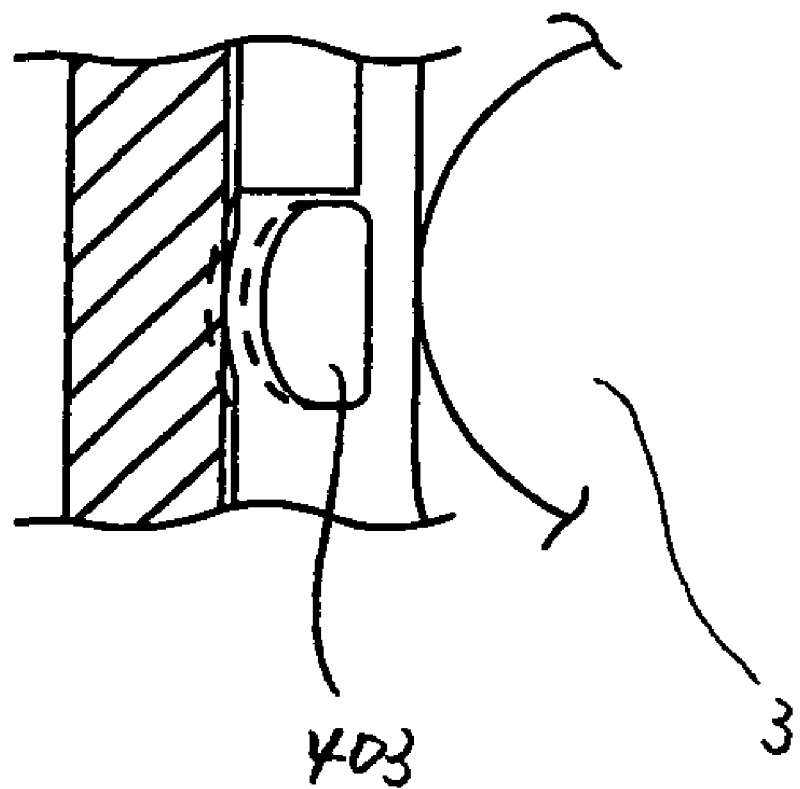
Figure 15:
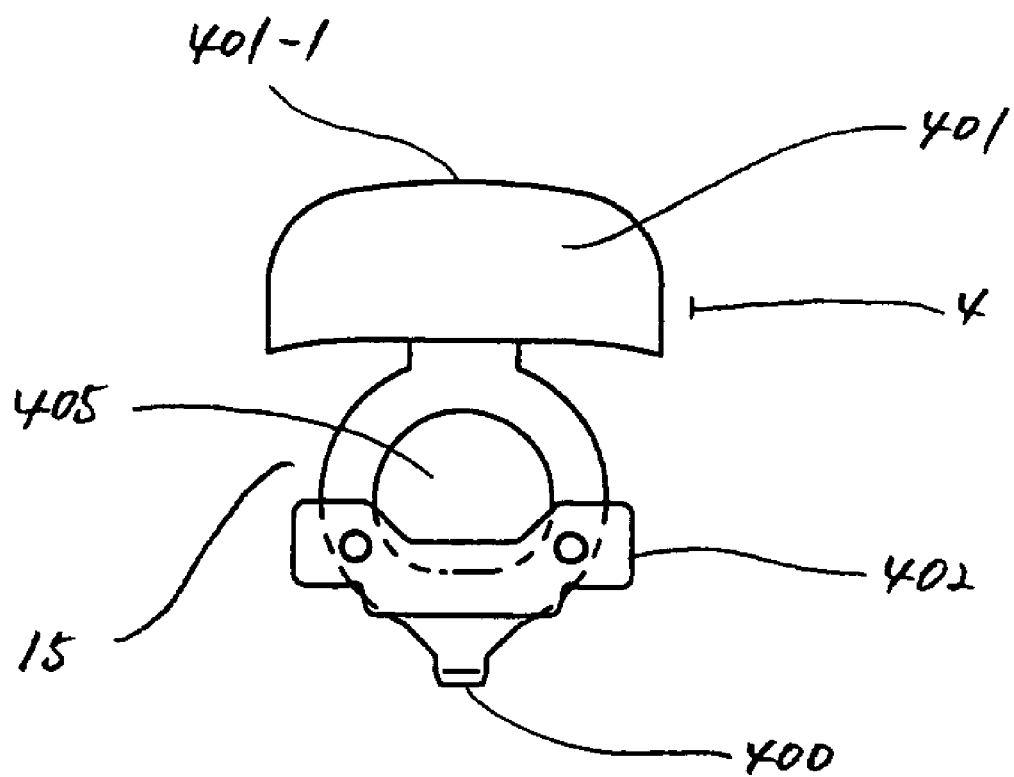
FIG. 15 is a plan view showing an example of another locking member.

First of all, drawings are explained. FIG. 1 is a reduced-scale schematic view showing the relationship among a headrest support, a headrest, a receiving member and a seat; FIG. 2-1 is a front view of the headrest support; FIG. 2-2 is a back view of the headrest support; FIG. 3 is a cross-sectional view of FIG. 2-1; FIG. 4 is a front view showing a state in which the headrest support is fitted in a receiving member; FIG. 5 is an enlarged front view of an essential part showing the headrest support, and a head portion, a neck portion and a barrel portion of the headrest; FIG. 6 is a cross-sectional view taken along a line A-A in FIG. 5; FIG. 7 is a cross-sectional view taken along a line B-B in FIG. 5; FIG. 8 is a cross-sectional view taken along a line C-C in FIG. 5; FIG. 9-1 is a view as viewed from P1 in FIG. 7; FIG. 9-2 is a view as viewed from P2 in FIG. 7; FIG. 10 is a view as viewed from P3 in FIG. 7; FIG. 11 is a plan view showing an example of a locking member; FIG. 12 is a schematic view for explaining the relationship between a cavity portion of the headrest support and the locking member; FIG. 13-1 is an enlarged plan view showing an example of a resilient means of the locking member, that is, an example of a hole which can suitably cope with a large load; FIG. 13-2 is an enlarged plan view showing an example of a resilient means of the locking member, that is, another example of the hole which can suitably cope with a large load; FIG. 13-3 is an enlarged plan view showing an example of a resilient means of the locking member, that is, an example of a hole which can suitably cope with an intermediate load; FIG. 13-4 is an enlarged plan view showing an example of a resilient means of the locking member, that is, an example of the hole which can suitably cope with a small load; FIG. 14-1 is an enlarged schematic view for explaining the relationship between the resilient means and the stay shown in FIG. 13-1; FIG. 14-2 is an enlarged schematic view for explaining the relationship between the resilient means and the stay shown in FIG. 13-2; FIG. 14-3 is an enlarged schematic view for explaining the relationship between the resilient means and the stay shown in FIG. 13-3; FIG. 14-4 is an enlarged schematic view for explaining the relationship between the resilient means the stay shown in FIG. 13-4 and; and FIG. 15 is a plan view showing an example of another locking member.

Hereinafter, preferred embodiments of the present invention are explained.

A headrest support 1 is constituted of a head portion 100, a neck portion 101 and a barrel portion 102 and is formed by integral molding using resin thus achieving reduction of cost, mass production and stable quality. Through holes 2 are formed in the headrest support 1 in a state that the through holes 2 penetrate from an upper surface of the head portion 100 to a bottom surface of the barrel portion 102 of the headrest support 1. Stays 3 of a headrest A are inserted into the through holes 2. Then, a locking member 4 (stopper) for locking the stay 3 is fitted in a cavity portion 100a of the head portion 100 through an open portion 100a-1, while a hook member 400 of the locking member 400 is set in a state that the hook member 400 is engaged with an engaging portion 100a-2 of the cavity portion 100a. Further, a manipulation button 401 of the locking member 4 is positioned at an eaves portion 100b of the head portion 100 in a state that the locking member 4 is fitted in the cavity portion 100a and a free end 40 1-1 of the locking member 4 projects from eaves portion 100b. Then, in this projecting state, one surface of an engaging plate 402 of the locking member 4 is engaged with a cut groove 300 formed in the stays 3 for locking and/or positioning or preventing the removal of the stays 3. Further, in a state in which the manipulation button 401 of the locking member 4 is pressed so that the locking member 4 is substantially completely fitted in the cavity portion 100a, the locking member 4 is positioned inside the eaves portion 100b of the head portion 100 and a free end 401-1 is accommodated in the inside of the eaves portion 100b. In this accommodated state, one surface of the engaging plate 402 of the locking member 4 is spaced apart from the cutting groove 300 formed on the stays 3 for locking and/or positioning and for preventing the removal of the stays 3 and hence, the stays 3 can be elevated or lowered.

The neck portion 101 is formed to have a diameter larger than a diameter of the barrel portion 102 by one stage, wherein an annular notched portion 101a which reaches the through hole 2 is formed in the large diameter portion and an annular receiving member pressing portion 5 which is substantially similar to the notched portion 101a is formed in the notched portion 101a by way of a connecting member 101b. Further, a gap 500 is formed between the receiving member pressing portion 5 and the notched portion 101a so as to impart the resiliency (spring characteristics) to the receiving member pressing portion 5. The resiliency generated by the gap 500 is added to the resiliency attributed to a material and the annular shape of the receiving member pressing portion 5. Due to this synthesized resiliency, the receiving member pressing port ion supports an upper surface 600 of the receiving member 6 and, at the same time, restricts the movement of the receiving member 6 in the upward and downward direction. Accordingly, it is possible to obviate the rattling sounds which may be generated between the receiving member pressing portion 5 and the upper surface 600 of the receiving member 6 (see FIG. 4 and FIG. 7). Further, a third stay pressing portion 7 having resiliency is formed on the receiving member pressing portion 5 in a state that the third stay pressing portion 7 extends in the upward and downward direction. The third stay pressing portion 7 is configured to be brought into contact with the stay 3 thus eliminating a play between the stay 3 and the headrest support 1 whereby the generation of rattling sounds can be obviated (see FIG. 6).

Further, a pair of resilient members 8 which assume a facing relationship are provided to an upper portion 102a of the barrel portion 102, while a pair of resilient members 8a which assume a facing relationship are provided to an intermediate portion 102b of the barrel portion 102. These resilient members 8, 8a are configured to be resiliently brought into contact with upper and lower portions 6a, 6b of an inner surface of the receiving member 6 thus eliminating a play between the headrest support 1 and the receiving member 6 whereby the generation of rattling sounds can be obviated (see FIG. 4). These pairs of resilient members 8, 8a are also effective for preventing play in the frontward and rearward direction and/or in the upward and downward direction. Further, the provision of these pairs of resilient members 8, 8a constitutes one example and there may be an example in which one member may be used at each portion from the viewpoint of simplification, the reduction of cost and the like. Further, on a front side of the upper portion 102a, a second stay pressing portion 9 having resiliency is formed in a state that the second stay pressing portion 9 is offset from a center line H, wherein the second stay pressing portion 9 is bent inwardly by making use of two third cut grooves 90, 90. However, the second stay pressing portion 9 which is formed in an offset manner constitutes one example and there may be a case that the second stay pressing portion 9 is arranged at the center line H or the like in view of the structure and the sizes of the headrest support 1, the various relationships including a positional relationship of the pair of resilient members 8, 8a (not shown in the drawing), the simplification, the reduction of cost or the like.

The second stay pressing portion 9 is configured to be brought into pressure contact with the stay 3 thus eliminating a play between the stay 3 and the headrest support 1 whereby the generation of rattling sounds can be obviated (see FIG. 8). The second stay pressing portion 9 is also effective for preventing play in the frontward and rearward direction and/or in the upward and downward direction of the headrest support 1 and/or the stay 3. As a result of pressure contact of the headrest support 1 with the stay 3 attributed to the offset and the pressure contact of the headrest support I to the receiving member 6 attributed to the resilient members 8, 8a, the balance among three elements (the stay 3, the headrest support 1 and the receiving member 6) can be ensured whereby the generation play and rattling sounds which are generated in the gaps formed among these elements can be obviated. Further, a removal prevention bulging portion 10 having resiliency is formed on an intermediate lower portion 102c. The removal prevention bulging portion 10 is bent or curved inwardly by making use of an approximately mountain-like cut groove 1000 and, at the same time, a lower surface 601 of the receiving member 6 impinges on a flange portion 1001 of the removal prevention bulging portion 10 whereby it is possible to prevent the generation of a play in the upward and downward direction of the receiving member 6 by way of the above-mentioned receiving member pressing portion 5. Because the removal prevention bulging portion 10 is brought into pressure contact with the stage 3 as a result of the inward curving or bending thereof, it is possible to obviate the generation of rattling sounds between the headrest support 1 and the stay 3. Here, because the receiving member 6 is fixedly secured to a frame body A-1 of a seat A, the provision of the removal prevention bulging portion 10 is also effective for the prevention of the plays in the upward and downward direction and/or in the left and right direction of the headrest support 1 and/or the stay 3. Here, a first stay pressing portion 11 having resiliency is formed on the removal prevention bulging portion 10, wherein the first stay pressing portion 11 is curved inwardly by making use of two second cut grooves 1002 and hence, the removal prevention bulging portion 10 impinges on an outer peripheral surface of the stay 3 whereby the generation of the play and the rattling sounds in the frontward and rearward direction of the headrest support 1 and the stay 3 can be obviated.

Further, on a front surface and/or a back surface of the barrel portion 102 extending between an upper portion 102a and an intermediate portion 102b thereof, a stay-and-receiving member pressing portion 13 having resiliency is formed in a state that the stay-and-receiving member pressing portion 13 is set free from the barrel portion 102 in at least two directions, wherein the stay-and-receiving-member pressing portion 13 is configured to be brought into pressure contact with the slay 3 and/or the receiving member 6 thus eliminating the plays among three elements whereby the generation of rattling sounds can be obviated (see FIG. 3, FIG. 7 and the like). Due to a synergistic effect of combined pressure contact and/or repulsion among these three elements, it is possible to obviate the generation of combined plays and rattling sounds in the frontward and rearward direction and/or in the upper and lower direction among three elements. In this embodiment, the stay-and-receiving-member pressing portion 13 is formed on the front surface and/or the back surface of the barrel portion 102 by forming two first cut grooves 1300 which face each other. Further, the stay-and-receiving-member pressing portion 13 includes curved inner surfaces 1301 and projecting outer surfaces 1302, wherein the curved inner surfaces 1301 resiliently sandwich an outer peripheral surface of the stay 3 (the curved inner surfaces 1301 being brought into pressure contact with the outer peripheral surface of the stay 3), while the projecting outer surfaces 1302 are brought into pressure contact with an inner surface 6c of the receiving member 6 and hence, the plays among three elements can be eliminated whereby the generation of the rattling sounds can be obviated. Further, it is advantageous to form projecting members 1301a on the curved inner surfaces 1301. This is because that the curved inner surfaces 1301 sandwich the stay 3 more resiliently. Further, it is desirable to increase a width (for example, in the left and right direction in FIG. 2-1) of the stay-and-receiving-member pressing portion 13 compared to a width of a stay pressing portion of the conventional headrest support (literature 1) so as to increase a resilient width (spring width). Due to such a constitution, it is possible to reliably obviate the generation of combined plays and rattling sounds in the frontward and rearward direction and/or in the upward and downward direction among three elements.

Further, although it is ideal that the stay-and-receiving-member pressing portion 13 has the uniform width on the front surface and/or the back surface of the headrest support 1, the width may be changed when necessary (same understanding applicable to other constitutions provided that the constitution has the pair structure). Here, in this embodiment, to form the stay-and-receiving-member pressing portion 13 by integral molding or one cut molding, the stay-and-receiving-member pressing portions 13 are formed on the front surface and/or the back surface of the barrel portion 102. However, the stay-and-receiving-member pressing portion 13 may be formed on any position provided that the stay-and-receiving-member pressing portion 13 is formed on a peripheral wall of the barrel portion 102. Further, the number of stay-and-receiving-member pressing portion 13 is not limited.

In the drawing, numeral 14 indicates projecting portions which are formed on an inner surface 2a of the through hole 2 (head portion 100) in an offset manner. With the use of these projecting portions 14, it is possible to obviate the generation of plays and rattling sounds of the stay 3.

Next, to explain the locking member 4 which is fitted in the cavity portion 100a of the head portion 100 of the headrest support 1, the locking member 4 includes a planer portion 404 which extends from the manipulation button 401 and a hook member 400 is formed on a distal end of the planer portion 404. Further, an engaging plate 402 is mounted on the distal end of the planer portion 404 or inside the planer portion 404. The manner of operation of the engaging plate 402 is as described above. FIG. 11 to FIG. 15 are provided to show the structures which do not adopt the conventional spring (resilient means). That is, these structures are mechanisms which replace the so-called spring, wherein a resilient means is formed on the planer portion 404. To explain one example, by forming a portion 403a in which through holes 403 are formed on the planer portion 404 by molding, the portion 403a is made extendible and compressible. An extension and compression of the portion 403a allows the portion 403a to function as a resilient means 15. Accordingly, the resilient means 15 (portion 403a) is not compressed by the pressing of the manipulation button 401, while when the hook member 400 impinges on a wall surface 100a-3 of the cavity portion 100a and is compressed due to the further pressing. Further, at the time of compression, the hook member 400 is disengaged from the cut groove 300 for locking and/or positioning and preventing the removal of the stay 3 formed on the stay 3. Further, when the pressing of the manipulation button 401 is released, the resilient means 15 generates a repulsive force and hence, the hook member 400 is engaged with an engaging member 100a-2 of the cavity portion 100a and, at the same time, when the compression is released, one surface of the engaging plate 402 is engaged with the cut groove 300 for locking and/or positioning the stay 3 and for preventing the removal of the stay 3. Here, the compression and/or the repulsion of the resilient means 15 are adjusted corresponding to a shape and/or sizes or the like of the through hole 403 so as to cope with a load applied to the headrest support 1. Further, the adjustment is also effective to obviate the generation of the rattling sounds. As preferred examples of the resilient means 15, FIG. 13-1 and FIG. 13-2 show the structure which can cope with a large load and can be adopted by a large vehicle, a racing car or a deluxe vehicle. FIG. 13-3 shows the structure which can cope with a middle load and is adopted by a middle-sized vehicle or an ordinary vehicle. FIG. 13-4 shows the structure which can cope with a small load and is adopted by a small-sized vehicle, a light-weighted vehicle and a gaming vehicle. In this manner, the resilient means 15 has the all-purpose property as the structure which can cope with the respective kinds of vehicles and can enhance functions thereof. FIG. 14-1 to FIG. 14-4 show the relationships between the portion 403a having the holes 403 (resilient means 15) in respective examples shown in FIG. 13-1 to 13-4 and a side wall surface 100a-4 of the cavity portion 100a and show a state in which the portion 403a is pressed thus giving rise to a repulsive force, and the locking member 4 is made to return due to such a repulsive force. Here, FIG. 15 is an example which further, simplifies the shape of the planer portion 404. In the drawing, the planer portion 404 is formed in an annular shape and the adjustment of the compression and/or the repulsion of the resilient means 15 is performed by making use of the extension and compression of the annular shape. Here, the resilient means 15 can perform the above-mentioned adjustment providing that the resilient means 15 has a resilient function such as the change of thickness (reduction of wall thickness), the change of width (narrowing of the width) or shape of slits (holes, recessed or projected portions). In the drawing, numeral 405 indicates a through hole for allowing the stay 3 to pass therethrough. Further, the resilient means 15 is also effective in obviating the generation of plays and the rattling sounds in the frontward and rearward direction and/or in the left and right direction. Further, in the drawing, numeral 16 indicates an elongated hole formed in the barrel portion 102. Further, the locking member 4 is also applicable to a similar headrest support (not shown in the drawing) (literature 2). Further, the locking member 4 may be used along with the conventional spring.

Further, the division of the first to third cut grooves 1300 to 90 by numerals is provided for facilitating the understanding of the invention and for specifying the locations. Further, accordingly, the cut grooves are not limited to these cut grooves 1300 to 90.

Further, the constitutions relevant to the obviating of the generation of plays and the rattling sounds in the above-mentioned frontward and rearward direction, in the left and right direction and/or upward and downward direction are shown in Table 1. Further, the correspondence of the locking member 4 to the loads, the relationship between the loads and deflation or vehicles to which the loads are applied are shown in Table 2.

TABLE 1

|  | frontward and rearward direction |  | left and right direction |  | upward and downward direction |  |
|---|---|---|---|---|---|---|
| prior art | Apply load to stay. Provide a pair of resilient members. (See FIG. 8) Adjust height, position, number of projecting portions of headrest support, (See FIG. 10) |  | A Increase width of stay-and-receiving-member, (See FIG. 2-1. FIG, 2-2, FIG. 4 or the like) D | B | Add third stay pressing portion. (See FIG. 5) | C |
| present Invention | Provide resilient means in frontward end rearward direction to locking member to eliminate play of stay. (See FIG. 11 to FIG. 13) |  | G Add third stay pressing portion to receiving-member pressing portion. (See FIG. 5) | C |  |  |
|  |  |  | Add first stay pressing portion to removal prevention bulging portion. (See FIG. 2-1, FIG. 2-2, FIG, 4 or the like) | F |  |  |
|  |  |  | Add second stay pressing portion to barrel portion. (See FIG. 5) | F |  |  |

TABLE 2

|  | locking member capable of suitably coping with large load | locking member capable of suitably coping with Intermediate load | locking member capable of suitably coping with small load |
|---|---|---|---|
| drawings | See FIG. 14-1 and FIG. 14-2 | See FIG. 14-4 | See FIG. 14-3 |
| structure | Adopt structure which includes a plurality of holes or a large-sized elliptical hole structure so as to obtain large deflection. Further, wall thickness changeable. Posses some degree of freedom | Adopt halved elliptical hole structure with outwardly bulged shape so as to obtain middle deflection. Further, wall thickness changeable. | Adopt halved elliptical hole structure with inwardly bulged shape so as to obtain small deflection. Further, wall thickness changeable. |
| targeted vehicles | large-sized vehicle, racing car and deluxe car | middle-sized vehicle or ordinary car | small-sized vehicle, light-weighted car and gaming car |

What is claimed is:

1. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, and an outer peripheral surface of the stay is pressed by the curved inner surfaces of the stay-and-receiving-member pressing portion and an inner surface of the receiving member is pressed by the projecting outer surfaces of the stay-and-receiving-member pressing portion and/or the respective pairs of the resilient members.

2. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a first stay pressing portion is formed by a second cut groove in a removal prevention bulging portion provided on an intermediate lower portion of the barrel portion, the first stay pressing portion is free to move with respect to the removal prevention bulging portion, and an outer peripheral portion of the stay is pressed by the curved inner surfaces of the stay-and-receiving-member pressing portion and/or the first stay pressing portion and an inner surface and a lower surface of the receiving member is pressed by the projecting outer surfaces of the stay-and-receiving-member pressing portion and/or the respective pairs of the resilient members.

3. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a stay pressing portion having resiliency is formed by two cut grooves in an upper portion of the barrel portion the stay pressing portion is free to move with respect to the barrel portion" (note: these two cut grooves (90) are best depicted in FIG. 5); and an outer peripheral portion of the stay is pressed by the curved inner surfaces of the stay-and-receiving-member pressing portion and/or the stay pressing portion and an inner surface of the receiving member is pressed by the projecting outer surfaces of the stay-and-receiving-member pressing portion and/or the respective pairs of the resilient members.

4. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a receiving member pressing portion is formed on an upper portion of the barrel portion by forming an annular cut groove, the receiving member pressing portion is free to move with respect to the barrel portion, a stay pressing portion is formed on the receiving member pressing portion, and an outer peripheral portion of the stay is pressed by the curved inner surfaces of the stay-and-receiving-member pressing portion and/or the stay pressing portion and an inner surface and an upper surface of the receiving member is pressed by the projecting outer surfaces of the stay-and-receiving-member pressing portion and/or the respective pairs of the resilient members, and the receiving member pressing portion.

5. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a removal prevention bulging portion is formed on an intermediate portion of the barrel portion and a first stay pressing portion is formed in the removal prevention bulging portion, the first stay pressing portion is free to move with respect to the removal prevention bulging portion by way of a second cut groove, a second stay pressing portion having resiliency is formed on an upper portion of the barrel portion by two additional cut grooves in the upper portion of the barrel portion, the second stay pressing portion is free to move with respect to the barrel portion, and a receiving member pressing portion is formed on an upper portion of the barrel portion by forming an annular cut groove in the upper portion of the barrel portion in a state that the receiving member pressing portion is set free from the barrel portion, a third stay pressing portion is formed in the receiving member pressing portion, and an outer peripheral portion of the stay is pressed by the curved inner surfaces of the stay-and-receiving-member pressing portion, and/or the first, second and third stay pressing portions and an inner surface, a lower surface and an upper surface of the receiving member are pressed by the projecting outer surfaces of the stay-and-receiving-member pressing portion and/or the respective pairs of the resilient members, the removal prevention bulging portion and the receiving member pressing portion.

6. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, an outer peripheral surface of the stay is pressed by the curved inner surfaces of the stay-and-receiving-member pressing portion and an inner surface of the receiving member is pressed by the projecting outer surfaces of the stay-and-receiving-member pressing portion and/or the respective pairs of the resilient members, and a locking member which is assembled to the head portion of the headrest support, wherein a resilient means for returning the locking member from a released position to a locked position is provided on a planar portion of the locking member thus allowing the return of the locking member with the resilient means.

7. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a first stay pressing portion is formed by a second cut groove in a removal prevention bulging portion provided on an intermediate lower portion of the barrel portion, the first stay pressing portion is free to move with respect to the removal prevention bulging portion, an outer peripheral portion of the stay is pressed by the curved inner surfaces of the stay-and-receiving-member pressing portion and/or the first stay pressing portion and in inner surface and a lower surface of the receiving member is pressed by the projecting outer surfaces of the stay-and-receiving-member pressing portion and/or the respective pairs of the resilient members, and a locking member which is assembled to the head portion of the headrest support, wherein a resilient means for returning the locking member from a released position to a locked position is provided on a planar portion of the locking member thus allowing the return of the locking member with the resilient means.

8. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a stay pressing portion having resiliency is formed by two cut grooves in an upper portion of the barrel portion, the stay pressing portion is free to move with respect to the barrel portion, an outer portion of the stay is pressed by the curved inner surfaces of the stay-and-receiving-member pressing portion and/or the stay pressing portion and an inner surface of the receiving member is pressed by the projecting outer surfaces of the stay-and-receiving-member pressing portion and/or the respective pairs of the resilient members, and a locking member which is assembled to the head portion of the headrest, wherein a resilient means for returning the locking member from a released position to a locked position is provided on a planar portion of the locking member thus allowing the return of the locking member with the resilient means.

9. A headrest support which holds a headrest arranged on a seat by fitting engagement, is supported on a receiving member which arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a receiving member pressing portion is formed on an upper portion of the barrel portion by forming an annular cut groove, the receiving member pressing portion is free to move with respect to the barrel portion, a stay pressing portion is formed on the receiving member pressing portion, an outer peripheral portion of the stay is pressed by the curved inner surfaces of the stay-and-receiving-member pressing portion and/or the stay pressing portion and an inner surface and an upper surface of the receiving member is pressed by the projecting outer surfaces of the stay-and-receiving-member pressing portion and/or the respective pairs of the resilient members, and the receiving member pressing portion, and a locking member which is assembled to the head portion of the headrest support, wherein a resilient means for returning the locking member from a released position to a locked position is provided on a planar portion of the locking member thus allowing a return of the locking member with the resilient means.

10. A headrest support which holds a headrest arranged on a seat by fitting engagement, is supported on a receiving member which is arranged on the seat, and has a through hole which allows fitting of a stay of the headrest therein, wherein the headrest support is constituted by an approximately umbrella shaped head portion, a neck portion which is formed below the head portion, and an approximately cylindrical barrel portion arranged below the neck portion, wherein the head portion, the neck portion and the barrel portion are formed integrally, a stay-and-receiving-member pressing portion having resiliency is formed by a first cut groove in an intermediate portion of the barrel portion, the stay-and-receiving-member pressing portion is free to moved in at least two directions with respect to the barrel portion, the stay-and-receiving-member pressing portion is formed in an arcuate shape as viewed in a side cross section, and includes a plurality of curved inner surfaces which are curved toward a stay side and include projecting members formed at a center portion of an arcuate inner surface, and a plurality of sharply projecting outer surface portions which project toward a receiving member side formed on an arcuate outer surface end portion, one or plural pairs of resilient members are respectively formed on an upper portion and an intermediate portion of the barrel portion, a removable prevention bulging portion is formed on an intermediate portion of the barrel portion and a first stay pressing portion is formed in the removal prevention bulging portion, the first stay pressing portion is free to move with respect to the removal prevention bulging portion by way of a second cut groove, a second stay pressing portion having resiliency is formed on an upper portion of the barrel portion by two additional cut grooves in the upper portion of the barrel portion the second stay pressing portion is free to move with respect to the barrel portion, a receiving member pressing portion is formed on an upper portion of the barrel portion by forming an annular cut groove in the upper portion of the barrel portion, the receiving member pressing portion is free to move with respect to the barrel portion, a third stay pressing portion is formed in the receiving member pressing portion, an outer peripheral portion of the stay is pressed by the curved inner surfaces of the stay-and-receiving-member pressing portion and/or the first, second and third stay pressing portions and an inner surface, a lower surface and an upper surface of the receiving member are pressed by the projecting outer surfaces of the stay-and-receiving-member pressing portion and/or respective pairs of the resilient members, the removal prevention bulging portion and the receiving member pressing portion, and a locking member which is assembled to the head portion of the headrest support, wherein a resilient means for returning the locking member from a released position to a locked position is provided on planar portion of the locking member this allowing the return of the locking member with the resilient means.

* * * * *